US012534595B2

(12) United States Patent
Mrozek et al.

(10) Patent No.: US 12,534,595 B2
(45) Date of Patent: Jan. 27, 2026

(54) NON CROSSLINKED POLYMER WITH PARTICULATES

(71) Applicant: U.S. Army Research Laboratory, Adelphi, MD (US)

(72) Inventors: Randy A. Mrozek, Port Deposit, MD (US); Joseph L. Lenhart, Port Deposit, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/157,496

(22) Filed: Oct. 11, 2018

(65) Prior Publication Data

US 2020/0115523 A1    Apr. 16, 2020

(51) Int. Cl.
*C08K 3/36*      (2006.01)
*C08K 7/18*      (2006.01)
*G01L 5/00*      (2006.01)
*G01L 5/14*      (2006.01)

(52) U.S. Cl.
CPC ............... *C08K 3/36* (2013.01); *C08K 7/18* (2013.01); *C08K 2201/005* (2013.01); *C08K 2201/011* (2013.01); *G01L 5/0052* (2013.01); *G01L 5/14* (2013.01)

(58) Field of Classification Search
CPC ...... C08K 3/36; C08K 7/18; C08K 2201/005; C08K 2201/011; C08L 83/04; C08L 83/06; G01L 5/0052; G01L 5/14
See application file for complete search history.

(56) References Cited

U.S. PATENT DOCUMENTS

| | | | | |
|---|---|---|---|---|
| 5,147,704 A * | 9/1992 | Lin | ............................ | D01F 1/09 139/420 R |
| 5,861,449 A * | 1/1999 | Akitomo | .................... | B44C 3/04 524/269 |
| 5,942,565 A * | 8/1999 | Okami | ................... | C08K 5/5442 524/101 |
| 2002/0123003 A1* | 9/2002 | Kannurpatti | ............... | B41C 1/05 430/270.1 |
| 2006/0144286 A1* | 7/2006 | Baum | ....................... | C09D 5/16 106/18 |
| 2009/0121180 A1* | 5/2009 | Tsubokawa | ............. | B82Y 30/00 252/182.3 |
| 2014/0083165 A1* | 3/2014 | Carbo, Jr. | .............. | G01L 5/0052 73/12.01 |

FOREIGN PATENT DOCUMENTS

| | | | | |
|---|---|---|---|---|
| EP | 1858700 B1 * | 2/2006 | ............. | F41H 5/007 |
| JP | 2001276689 A * | 10/2001 | ............... | C08K 3/36 |
| WO | WO-2016140779 A1 * | 9/2016 | ............... | C08K 3/36 |

OTHER PUBLICATIONS

Herbert Barthel et al., "Particle Sizes of Fumed Silica," 21 Chem. ENg. Technol. 745 (1998).*
E. Kontou & G. Anthoulis, "The Effect of Sllica Nanoparticles on the Thermomechanical Properties of Polystyrene," 105 Journal of Applied Polymer Science 1723 (2007).*
Xiuqing Gong et al., "Influence of Liquid Phase on Nanoparticle-based Giant Electrorheological Fluid," 19 Nanotechnology 165602 (2008).*
Luca Ceseracciu et al., "Robust and Biodegradable Elastomers Based on Corn Starch and Polydimethylsiloxane (PDMS)," 7 ACS Appl. Mater. Interfaces 3742 (2015).*
S. O. Illyn et al., "Sol-Gel Transition and Rheological Properties of Silica Nanoparticle Dispersions," 78 Colloid Journal 608 (2016).*
A V. Minakov et al., "An Experimental Study of the Effect of Nanoparticle Additives on the Rheological Properties of a Suspension," 44 Technical Physics Letters 367 (2018).*
English-language machine translation of JP2001276689, via Espacenet on Jan. 27, 2020.*
Ma et al. "Rheology of fumed silica/polydimethylsiloxane suspensions", J. Rheol., 61(2), 205-215. Mar./Apr. 2017 (Year: 2017).*
Y.-H. Lin, "Entanglement and the Molecular Weight Dependence of Polymer Glass Transition Temperature" Macromolecules 1990, 23, 5292-5294.
Song, C; Wang, P; Makse, HA (2008) "A phase diagram for jammed matter", Nature 453:629-632.
Gent, AN; Liu, GL; Mazurek, M (1994) "Experimental study of molecular entanglement in polymer networks" Journal of Polymer Science, Part B: Polymer Physics 32:271-279.
Edwards et al. "Mechanical properties of silicone based composites as a temperatureinsensitive ballistic backing material for quantifying back face deformation" Forensic Science International vol. 285, Apr. 2018, pp. 1-12.

* cited by examiner

*Primary Examiner* — Jane L Stanley
(74) *Attorney, Agent, or Firm* — Eric B. Compton

(57) ABSTRACT

A composition of matter and method of forming the same includes a non-crosslinked polymer, and particulate material dispersed within the non-crosslinked polymer, wherein the composition of matter includes a viscoplastic property. The non-crosslinked polymer may include any of a silicon based polymer compound, an organo silicon polymer compound, at least one polysiloxane, polydimethylsiloxane, and methyl terminated polydimethylsiloxane. The non-crosslinked polymer may include any of polybutadiene, polyisoprene, poly(ethylene-co-butadiene), poly(ethylene-co-propylene), and polyisobutylene. The particulate material may include any of fumed silica, monodisperse silica spheres, fumed alumina, and mixtures thereof.

28 Claims, 23 Drawing Sheets

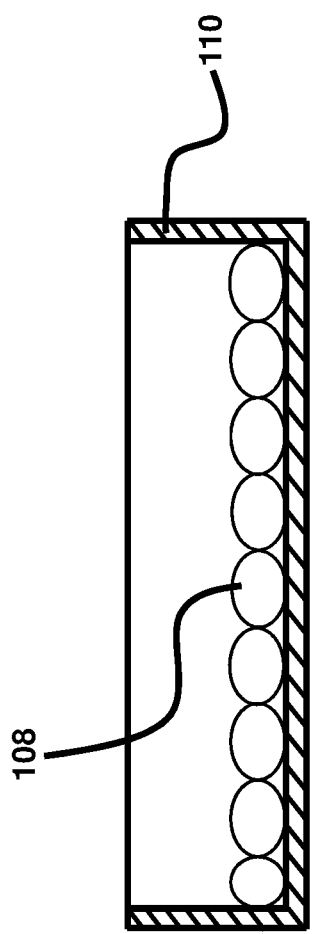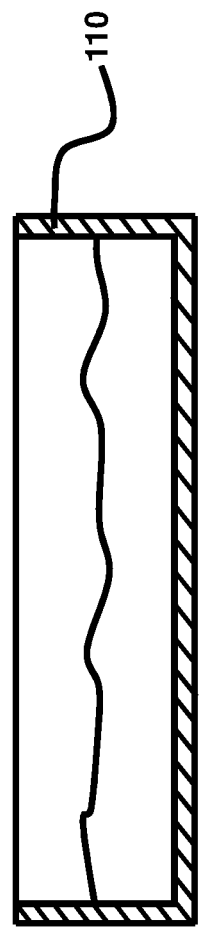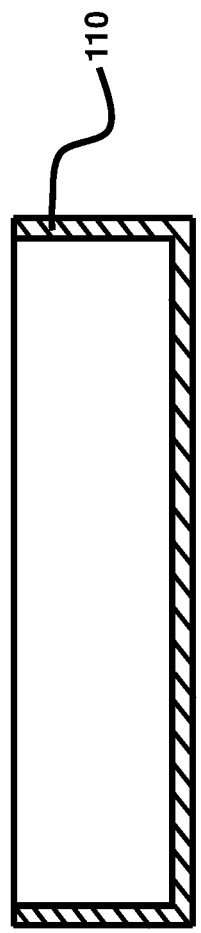

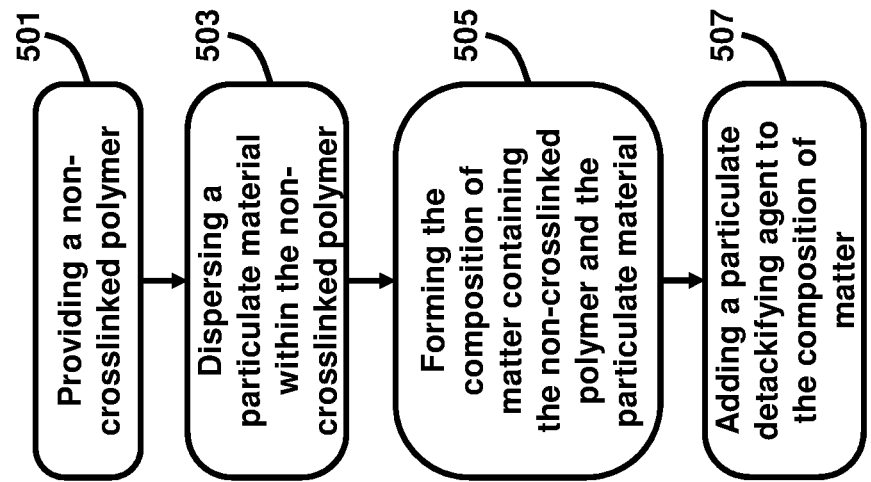
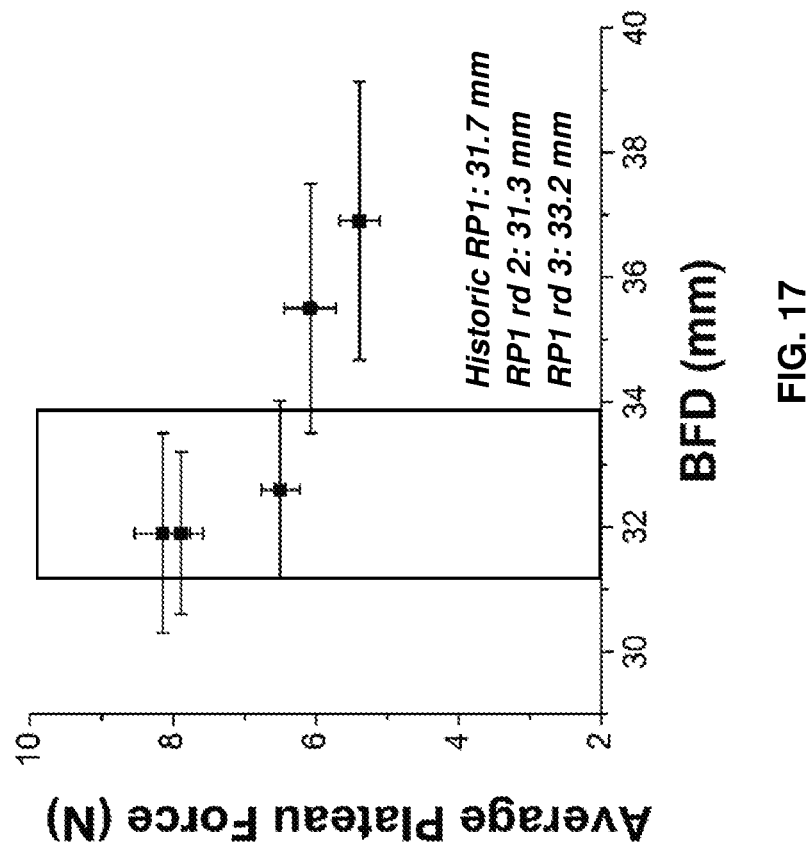

NON CROSSLINKED POLYMER WITH PARTICULATES

GOVERNMENT INTEREST

The embodiments described herein may be manufactured, used, and/or licensed by or for the United States Government without the payment of royalties thereon.

BACKGROUND

Technical Field

The embodiments herein generally relate to ballistic clay compositions for use as test media for measuring behind armor backface deformation (BFD).

Description of the Related Art

The conventional medium for measuring the behind armor BFD during testing and certification is Roma Plastilina #1 (RP1) commonly referred to as ballistic clay. RP1 was identified in a 1977 study that determined that the material exhibited a penetration depth as a function of time similar to animal testing. RP1 is also believed to exhibit minimal elastic recovery which allows the BFD measurement post-test rather than measured during the test, which would require expensive high speed cameras and complicated analysis. RP1 is a non-fireable modeling clay with a primary market in the artistic community. RP1 generally suffers from many problems including a strong temperature and time dependent response, sensitivity to handling conditions, batch to batch variability, and a performance that is dependent on shear history which limits the accuracy and reproducibility of armor assessment and hinders the development of new armor.

Over the years the formulation of RP1 has changed in response to changing feedstocks and the needs of the artistic community. As a result, the current RP1 formulation generally requires heating to 100° F. to obtain the desired response and exhibits a significant temperature-dependence such that the material is considered out of calibration within 45 min. RP1 also tends to exhibit lot-to-lot variability and a mechanical response that is sensitive to age, environment, and processing conditions, causing both the armor testing community, as well as the armor development industry, to question the accuracy and reliability of the testing results. The replacement of RP1 has been a significant focus of those involved in armor testing. However, after nearly fifteen years of research, no companies or government agencies have been successful at replacing RP1.

SUMMARY

In view of the foregoing, an embodiment herein provides a composition of matter comprising a non-crosslinked polymer; and particulate material dispersed within the non-crosslinked polymer, wherein the composition of matter comprises a viscoplastic property. The non-crosslinked polymer may comprise any of a silicon based polymer compound, an organo silicon polymer compound, at least one polysiloxane, polydimethylsiloxane, and methyl terminated polydimethylsiloxane. The non-crosslinked polymer may comprise at least one polymer compound having a molecular weight of entanglement ($MW_{ENT}$), wherein the polymer compound may have an average molecular weight in the range of from about two to about five times the $MW_{ENT}$.

The non-crosslinked polymer may comprise at least one polymer compound, and wherein the polymer compound has an average molecular weight in the range of from about 63,000 g/mol to about 432,000 g/mol. The polydimethylsiloxane may comprise an average molecular weight in the range of from about 63,000 g/mol to about 306,000 g/mol. The non-crosslinked polymer may comprise any of polybutadiene, polyisoprene, poly(ethylene-co-butadiene), poly(ethylene-co-propylene), and polyisobutylene. The particulate material may be selected from the group consisting of fumed silica, monodisperse silica spheres, fumed alumina, and mixtures thereof. The particulate material may comprise particles of a size in the range of from about 10 nm to about 1 μm.

The particulate material may comprise particles having a surface chemistry such that the particles form non-covalent bonds with other the particles or with the non-crosslinked polymer or with both other the particles and the non-crosslinked polymer. The composition of matter may comprise from about 2 to about 55 percent by volume of the particulate material. The composition of matter may comprise from about 28 to about 98 percent by volume of the non-crosslinked polymer. The composition of matter may comprise from about 45 to about 98 percent by volume of the non-crosslinked polymer.

The composition of matter may comprise from about 51 to about 96 percent by volume of the non-crosslinked polymer. The composition of matter may further comprise a particulate detackifying agent. The detackifying agent may comprise an average particle size of about 10 μm. The detackifying agent may comprise corn starch. The composition of matter may comprise about 36.2 percent by volume of the detackifying agent. The composition of matter may have an indentation response curve with an average plateau force that remains within plus or minus 1.0 N of a target force.

Another embodiment provides a method of forming a composition of matter, the method comprising providing a non-crosslinked polymer; dispersing a particulate material within the non-crosslinked polymer; and forming the composition of matter containing the non-crosslinked polymer and the particulate material, wherein the composition of matter comprises a viscoplastic property. The method may further comprise adding a particulate detackifying agent to the composition of matter.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 12A through 12C show views of the packing of an exemplary embodiment of the disclosed compositions (designated ARTIC 6.5) into a clay test box typically used for RP1;

FIG. 17 shows a plot of the average plateau force obtained during indentation against the measured ballistic BFD; the rectangular region represents the range of RP1 BFD values measured concurrently with the new material testing; and FIG. 18 is a flow diagram illustrating a method of forming a composition of matter.

DETAILED DESCRIPTION

Figure 1B:
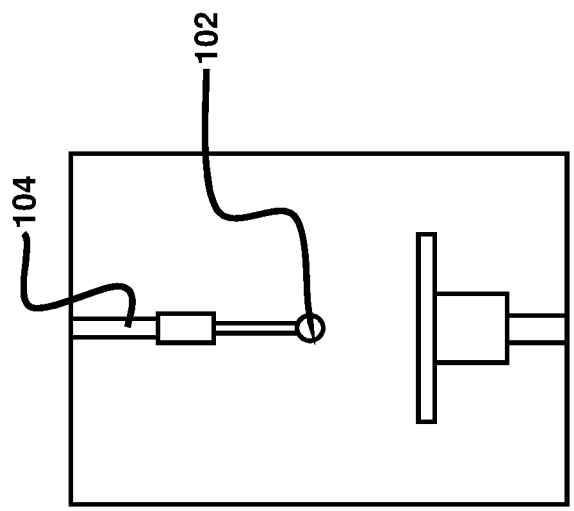
FIGS. 1A and 1B show an Anton Paar MCR-501 rheometer modified with a 6.35 mm spherical indenter to enable temperature-controlled indentation measurements.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide compositions for testing protective armor. The disclosed embodiments provide a test medium that allows the measurement of backface deformation of armor panels by preserving an impression of the armor backface deformation in the test medium, and are particularly well suited for providing an impression of backface deformation (BFD) in the absence of the complete penetration of the armor. Assessment of BFD is important in order to gauge the potential for injury to a person protected by the armor even in the absence of penetration of the armor.

The disclosed compositions include a non-crosslinked polymer and particulate material dispersed within the polymer, is also referred to herein as the structural particulate or particulate filler. The disclosed compositions are engineered to have a viscoplastic property. The viscoplastic property, which is also referred to as clay-like, is a type of thixotropic property where the material flows like a fluid under an applied force, but is then dimensionally stable when the force causing the deformation is removed, thus preserving its deformed state. In order for the embodiments herein to preserve a record of the BFD for later measurement, they must be inelastic, in other words they must not behave elastically and spring back to any appreciable degree because that would make it impossible to accurately measure the BFD of the armor.

The non-crosslinked polymer may be a polymer fluid and may include, or may be made up entirely of, a silicon-based polymer compound. The silicon based polymer compound may be an organosilicon polymer compound, also referred to as a polymeric organosilicon compound. At present, the preferred polymer compound is a polysiloxane, such that the non-crosslinked polymer includes, or may be made up entirely of, at least one polysiloxane. In the illustrative examples herein, the polysiloxane used is polydimethylsiloxane (PDMS). The particular polydimethylsiloxane used is methyl-terminated polydimethylsiloxane. In examples, the polymer comprises any of polybutadiene, polyisoprene, poly(ethylene-co-butadiene), poly(ethylene-co-propylene), and polyisobutylene.

The at least one polymer compound making up or included in the non-crosslinked polymer has a molecular weight of entanglement ($MW_{ENT}$), which is the molecular weight corresponding to the polymer chain length at which entanglements form between the polymer chains of the polymer compounds making up the non-crosslinked polymer or polymer fluid. The non-crosslinked polymer is usually made up of polymer compounds of varying molecular weight so that any reference to the molecular weight of the non-crosslinked polymer or the molecular weight of the polymer compound is really a reference to the average molecular weight of the non-crosslinked polymer or of the polymer compounds making up the non-crosslinked polymer. The non-crosslinked polymer or the polymer compound may have an average molecular weight in the range of from about two to about five times the $MW_{ENT}$.

In some embodiments, the non-crosslinked polymer or the polymer compound may have an average molecular weight in the range of from about 63,000 g/mol to about 432,000 g/mol. In some examples of the composition, the non-crosslinked polymer or the polymer compound may have an average molecular weight in the range of from about 63,000 g/mol to about 306,000 g/mol. In some embodiments, the non-crosslinked polymer or the polymer compound may have an average molecular weight in the range of from about 63,000 g/mol to about 139,000 g/mol. In some embodiments, the non-crosslinked polymer or the polymer compound may have an average molecular weight of about 63,000 g/mol.

In some embodiments, the polydimethylsiloxane has an average molecular weight in the range of from about 63,000 g/mol to about 306,000 g/mol. In some embodiments, the polydimethylsiloxane has an average molecular weight in the range of from about 63,000 g/mol to about 139,000 g/mol. In some embodiments, the polydimethylsiloxane has an average molecular weight of about 63,000 g/mol.

The particulate material, also referred to herein as the structural particulate or the particulate filler, is selected from the group consisting of fumed silica, monodisperse silica spheres, fumed alumina, and mixtures thereof. The particulate material may include particles of a size in the range of from about 10 nm to about 1 µm. In some embodiments, the particulate material may include particles of a size in the range of from about 10 nm to about 100 nm.

The particulate material may include particles having a surface chemistry such that the particles may form non-covalent bonds with other particles of the particulate material or with the non-crosslinked polymer, in other words with the polymer compounds making up the non-crosslinked polymer, or with both other particles of the particulate material and the non-crosslinked polymer. For the sake of convenience, the non-crosslinked polymer may be used herein to refer to both the non-crosslinked polymer and the polymer compounds making up the non-crosslinked polymer where such use will not cause confusion.

In some embodiments, the composition includes from about 2 to about 55 percent by volume of the particulate material. In some embodiments, the composition includes from about 2 to about 49 percent by volume of the particulate material. In some embodiments, the composition includes from about 2 to about 20 percent by volume of the particulate material. In some embodiments, the composition includes from about 4 to about 10 percent by volume of the particulate material.

In some embodiments, the composition may include from about 28 to about 98 percent by volume of the non-crosslinked polymer. In some embodiments, the composition may include from about 45 to about 98 percent by volume of the non-crosslinked polymer. In some embodiments, wherein the composition may include from about 51 to about 96 percent by volume of the non-crosslinked polymer.

The embodiments of the compositions herein may further include a particulate detackifying agent. The detackifying agent has an average particle size of about 10 µm. In the illustrative examples herein, the detackifying agent is or includes corn starch. The embodiments herein may include from about 5 to about 70 percent by volume of the detackifying agent. In some embodiments, the composition may include from about 10 to about 70 percent by volume of the detackifying agent. In some embodiments, the composition may include from about 30 to about 45 percent by volume of the detackifying agent. In some embodiments, the composition may include about 36.2 percent by volume of the detackifying agent.

Some exemplary embodiments herein have an indentation response curve with an average plateau force that remains within plus or minus 1.0 N of a target force. In some exemplary embodiments herein, the average plateau force remains within plus or minus 1.0 N of the target force over at least a penetration depth in the range of from about 10 to about 15 mm.

In some embodiments herein, the composition has an indentation response curve with a plateau. The indentation response curve shows the relation between force and penetration depth determined using a rheometer. With some exemplary embodiments herein, the force remains within a target range over composition temperatures ranging at least over a temperature range of from about 72° F. to about 100° F., such that the composition may be used for testing with the required level of accuracy, where the deformation of the composition reflects the deformation of a contacting surface, over at least the aforementioned temperature range.

With some exemplary embodiments herein, the force over the plateau remains within a range of variability of indentation response curves for RP1 at 100° F. over a range of penetration depths corresponding to the plateau, or at least a substantial portion thereof, with the composition temperature being at about 72° F. With some exemplary embodiments herein, the force over the plateau remains within a range of variability of indentation response curves for RP1 at 100° F. over a range of penetration depths corresponding to the plateau, or at least a substantial portion thereof, for composition temperatures at least ranging from about 72° F. to about 100° F. A substantial portion of the range of penetration depths corresponding to the plateau corresponds to a range of at least about 5 mm within the plateau region; non-limiting examples being the ranges of penetration depths from 7.5 to 12.5 mm, from 7.5 to 15 mm, from 7.5 to 20 mm, from 8 to 13 mm, from 8 to 15 mm, from 8 to 20 mm, and from 10 to 20 mm. Examples of indentation response curves may be seen in FIGS. 5A through 5C, 6C, and 10.

The disclosed examples describe an environmentally stable test media for measuring behind armor backface deformation (BFD). The disclosed examples define compositions including solid particulate filler, polymeric fluid, and detackifying agent that may match the rate-dependent response of RP1 without the environmental stability and material handling problems. In addition, the exemplary embodiments exhibit a more reproducible mechanical response than RP1. The impact of the disclosed compositions is to allow for the reliable and reproducible assessment of protective equipment for military, law enforcement, and civilians. In addition, unlike RP1, which is not readily tunable, the mechanical response of the disclosed test media are very tunable by manipulating the volume fractions and characteristics of the components in the various embodiments. This is critical for tuning the test medium behavior for improved assessment accuracy as personal injury criteria are refined through advances in military and medical understanding.

The embodiments herein provide a material that deforms similar to RP1 under ballistic conditions from a minimal number of well controlled commercial materials. Specifically, the embodiments herein use a polymeric fluid along with a particulate filler that will prevent the material from flowing without obtaining an elastic, or rubbery, response that would lead to an inaccurate back face deformation measurement. This balance of properties was achieved by using particulates that exhibit non-covalent interparticle interactions that may be broken during deformation, allowing the material to flow, and then reformed after the deformation has ceased. In addition, the polymer chains that comprise the fluid need to be sufficiently long to entangle with neighboring chains (i.e., have a molecular weight higher than the entanglement molecular weight ($MW_{ENT}$) for the polymer) but cannot be so highly entangled that the entanglements act like crosslinks during high rate deformation leading to elastic recovery and error in the BFD measurement. A third component includes a detackifying agent that reduces the adhesion of the material to the armor and also acts as a colorant to provide compatibility with the laser scanner used to measure the BFD. All of the components are selected to provide a minimal temperature dependence and exhibit a strain-rate dependence similar to RP1.

The embodiments herein provide a material configured to be used for the measurement of behind armor backface deformation that provides the desired response at room temperature. The embodiments herein provide dimensional stability while limiting the elastic recovery from deformation, particularly at high strain rates. Important factors for providing the desired indentation response and dimensional stability are the polymer molecular weight, the particulate filler surface chemistry, and the particulate surface area. The detackifying agent may simultaneously decrease the "stickiness" of the material and promote compatibility with commercially-available arm laser scanners. All of the components exhibit stability to environmental factors like temperature and humidity. In addition, the embodiments herein exhibit a minimal elastic response over the desired usable temperature range from 50° F. to 100° F.

The embodiments herein have been verified through side-by-side comparison of exemplary embodiments of the disclosed composition at room temperature against RP1 at 100° F. using rheology, indentation testing, compression, and spherical projectile penetration at speeds up to 600 m/s. It has been verified that the disclosed compositions pass the standard ball drop calibration test at room temperature. Ballistic testing has also been performed for assessing body armor and with ballistic range configurations as described in ASTM Standard E3062-16 using a soft body armor end item known as a shoot pack where the embodiments herein demonstrated similar performance at room temperature to that of RP1 at its calibrated elevated testing temperature of about 100° F.

One example use of the disclosed embodiments is as a ballistic backing material for measuring backface deformation during armor evaluation and certification. The characteristics of the embodiments herein may be tuned to provide a drop-in replacement for RP1. The embodiments herein exhibit unique energy dissipation behavior which may be tailored for specific applications.

The embodiments herein may be used in military armor applications as well as use by the artistic community as a sulfur-free alternative to RP1 in modeling and sculpture among other uses similar to RP1. The sulfur in RP1 may lead to corrosion of accompanying materials which, for example, has been an issue for museum exhibits. The embodiments herein may also be used as a children's toy, similar to modeling clay, that does not dry out. The material is composed of safe food grade ingredients which enhances the potential viability.

The disclosed composition is a test medium that is specifically configured to meet the needs of the body armor testing community and does not exhibit the issues associated with the current ballistic clay, RP1, including a response that depends on temperature, time, and working conditions. Some of the example compositions disclosed herein provide materials that are reusable, temperature-insensitive viscoplastic materials, which pass the standard ball drop calibration test at room temperature and provide a response that is independent of temperature from at least 72° F. to 100° F. Some of the example compositions disclosed herein meet the 14 performance criteria desired from an effective backface testing medium for replacing RP1, including:
1) Known, controlled and consistent changes in mechanical properties as a function of temperature, cold work and formulation;
2) Long useful life for repeated testing at room temperature; reusable; long shelf life (more than 1 year);
3) Known and controlled thixotropic recovery;
4) Minimal hardening as a function of time and impact rate;
5) Limited material recovery;
6) Excellent dimensional stability;
7) Minimal stickiness to the target;
8) Easy moldability with minimal voids, air bubbles or gaps;
9) Nontoxic;
10) Low flammability;
11) Minimum odor;
12) Reasonable price and weight per unit volume comparable with RP1;
13) X-Ray transparent; and
14) Surface compatible with commercially-available arm laser scanners.

It is critical that the test medium provides dimensional stability while exhibiting minimal elastic recovery from deformation to accurately measure the backface deformation (BFD). Examples of the disclosed compositions are composed of three primary components: a) a non-crosslinked polymer chain, b) a particulate to provide structure and dimensional stability, and c) a solid particulate detackifier. In addition to exhibiting a minimal temperature-dependence and environmental stability, each component must exhibit specific attributes to obtain the desired response in the final product.

Non-Crosslinked Polymer Chains

The mechanical response of polymers is typically described as viscoelastic referring to the combination of liquid-like viscous fluid flow and the ability to elastically recover from deformation. Both of these attributes will lead to inaccuracies in the BFD measurement. Viscous flow will distort the impression made upon impact if the flow timescale is faster than the time between the shot and the measurement. While elastic recovery of the material will result in the measured indentation after the test being less than the maximum indentation during the impact event. The elastic nature of the polymer becomes more prominent as the polymer chains are cross-linked into a polymer network therefore the disclosed compositions utilize non-crosslinked polymer chains. The viscoelastic nature of polymers makes the selection of molecular weight, or polymer chain length, critical to the performance of the disclosed compositions. Specifically, the molecular weight must be above the molecular weight where the polymer chains will start to entangle ($MW_{ENT}$) with neighboring chains to obtain dimensional stability of the final product. However, when the molecular weight is too high above the $MW_{ENT}$ the material will exhibit a strain-rate dependent mechanical response. This happens when the material deformation is too fast for the chains to disentangle, trapping the entanglements, making them behave mechanically like crosslinks. This behavior leads to increased stiffness and elastic recovery at high strain rates like those experienced during ballistic events. The inventors have determined that a molecular weight from 2 to 5 times the $MW_{ENT}$ is optimum for use as a ballistic backing material for measurement of BFD. It is preferable to be closer to 2 times the $MW_{ENT}$ in order to minimize the tack adhesion of the final product.

Particulate (Structural)

A particulate addition to the non-crosslinked polymer results in a dramatic increase in the viscosity. For disclosed examples of the compositions for BFD testing it is critical that the particulate concentration is high enough that the material exhibits dimensional stability or the absence of viscous flow on the timescale of the measurement. The structural particulate must also provide a surface chemistry that will promote the formation of a reversible secondary network that may easily be disrupted during deformation, allowing the material to temporarily flow, and then reform those interactions to regain dimensional stability after the deformation is halted. The extent and strength of these interactions will determine the force-displacement behavior during deformation and is the primary mechanism used to tailor the material response. The inventors have determined that particles with a high surface area and a surface chemistry that may form non-covalent interparticle bonding provide the most ideal response. It is critical that the combination of particulate loading and surface chemistry is sufficient to impart dimensional stability but not so strong as to provide increased resistance to penetration or impart elastic character. For example, the particle chemistry, size, and concentration must not interact with the polymer to strongly bridge multiple polymer chains together. This will result in essentially a cross-linked polymer network, similar to vulcanized rubber, which exhibits an elastomeric response.

Particulate (Detackifier)

The combination of a non-crosslinked polymer and the structural particulate that exhibits the desired force-displacement behavior was found to be very sticky (e.g., exhibits high tack adhesion). High adhesion makes the material more difficult to work with (e.g., packing into test boxes, "striking" the surface to provide a smooth armor interface, molding the material into anthropomorphic forms, etc.). Adhesion may also contribute to an inaccurate BFD measurement if the backing material sticks to the armor when it is removed resulting in a distorted indentation prior to BFD measurement. In addition, the combination of non-crosslinked polymer and structural particulate may be translucent making it impossible to use the standard FARO® arm laser scanner to record the BFD. This is particularly true when the features of the particle are smaller than the wavelength of light as is common with particles that exhibit a high surface area.

Low molecular weight polymer fluids, commonly silicone oils, are used for industrial products and applications that require reduced tack adhesion. However, the incorporation of a fluid is likely to represent an aging risk or largely be ineffective for this application. Typically, there is a driving force for the polymer fluid to be present at the surface and reduce adhesion. This driving force would likely produce a composition gradient from the surface into the bulk of the sample where the material would likely exhibit a change in performance over the graded region. However, a reduced driving force would result in the material being more uniformly dispersed throughout the material instead of at the surface where it may be most effective. In addition, the low molecular weight fluid would essentially dilute the base polymer and reduce the dimensional stability. As a result, the disclosed compositions use a particulate detackifier that reduced tack adhesion while also being larger in size than about 1 µm to also provide arm laser compatibility. The combined detackification and arm compatibility keeps the formulation to three primary components to avoid potential complicated performance trade-offs with an additional particulate ingredient.

The combination of these three components will result in a viscoplastic mechanical response where the material will exhibit dimensional stability, flow in response to deformation, and exhibit minimal elastic recovery. This viscoplastic behavior, also referred to as "clay-like" behavior, make examples of the disclosed compositions drop-in replacement candidates for RP1.

EXAMPLE 1

In this example, non-crosslinked polydimethylsiloxane (PDMS) fluids containing monodisperse silica spheres of varying size and concentration were studied. The materials used included non-crosslinked, methyl-terminated polydimethylsiloxane fluids purchased from Gelest Inc. (Morrisville, PA, USA). Monodisperse silica spheres 100 nm and 1 µm in diameter were purchased from Fiber Optic Center (New Bedford, MA, USA). All materials were used as received.

The test compositions or composites were produced using the following process. Polydimethylsiloxane (PDMS) fluids with individual molecular weights of 28,000, 63,000, 139,000, 204,000, 306,000 and 423,000 g/mol were mixed with 100 nm and 1 µm monodisperse silica spheres, respectively. The silica spheres and PDMS fluids were weighed out in the appropriate amounts to obtain the desired volume fraction of silica and then mixed with a spatula to obtain a highly viscous paste. The paste was then passed through a DSM Xplore conical twin screw extruder with the recirculation path closed in an effort to maintain a consistent residence time. After the first pass, the extrudate was mixed together and extruded for a second pass to obtain uniform mixing. A third pass was also explored however, no noticeable performance change was observed.

Figure 1A:
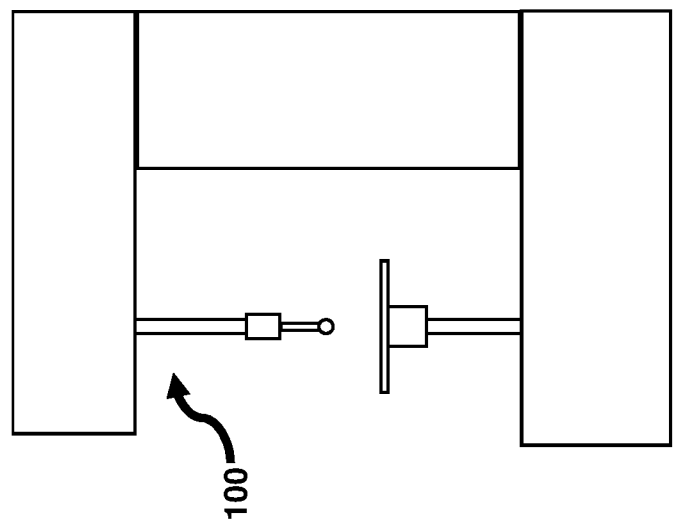

The indentation characteristics of the test compositions were measured using the following procedure. An Anton Paar MCR-501 rheometer 100 was modified by attaching a 6.35 mm diameter spherical indenter 102 onto an 8 mm probe 104 to enable temperature-controlled indentation testing (FIGS. 1A and 1B). The indenter 102 was pressed into an approximately 25 mm tall sample at a rate of 8 mm/s to a depth of 15 mm. The starting position was 5 mm above the sample to allow the probe 104 to reach constant velocity prior to contacting the sample.

Results:

The PDMS-silica composites were evaluated to qualitatively determine their dimensional stability. The extruded composites were formed into a sphere or cube and then monitored for several minutes to determine if any noticeably changes in the sample shape were observed indicating viscous flow. Materials composed of 1 µm silica spheres required loadings of greater than 49 vol % to obtain dimensional stability and it was only observed at the three highest molecular weights 208,000 g/mol, 306,000 g/mol, and 423,000 g/mol, denoted T208, T306, and T423, respectively. The minimum required loading of 49 vol % is significant because the maximum random packing for monodisperse spheres is 55 vol %. See Song, C., et al., "A phase diagram for jammed matter," Nature 453:629-632, 2008, incorporated by reference herein. Composites could be produced that contain 55 vol % spheres however, higher concentrations became very difficult to extrude due to the high viscosity and typically exhibit significant air voids attributed to the limitations of the particle packing.

Figure 2A:
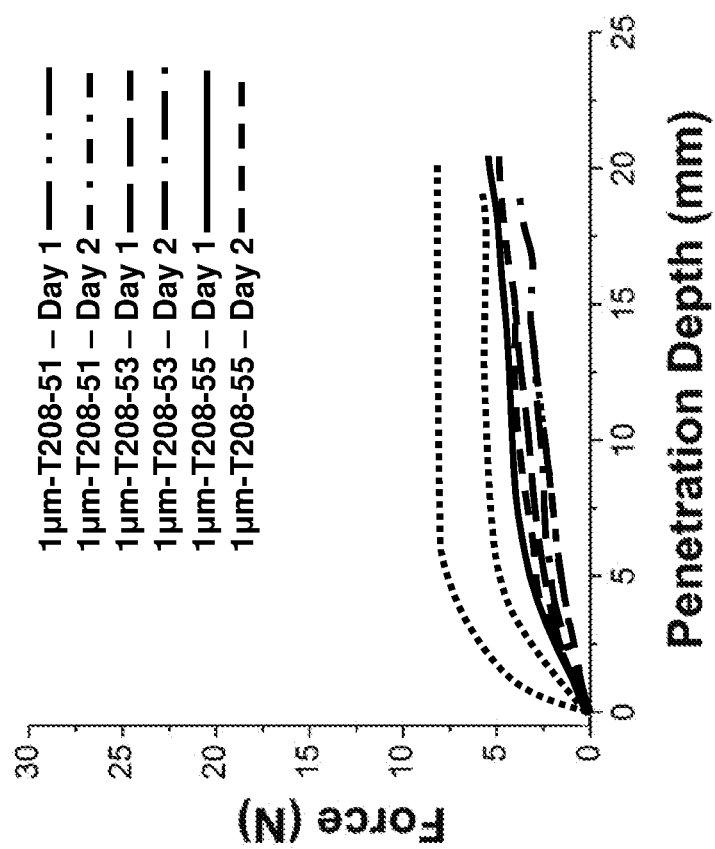
FIGS. 2A and 2C show the indentation response of materials composed of 1 μm silica spheres in T208, T306, and T423 PDMS, respectively; the band delineated by dotted lines provides the range of responses obtained for RP1 at 100° F.
Figure 2B:
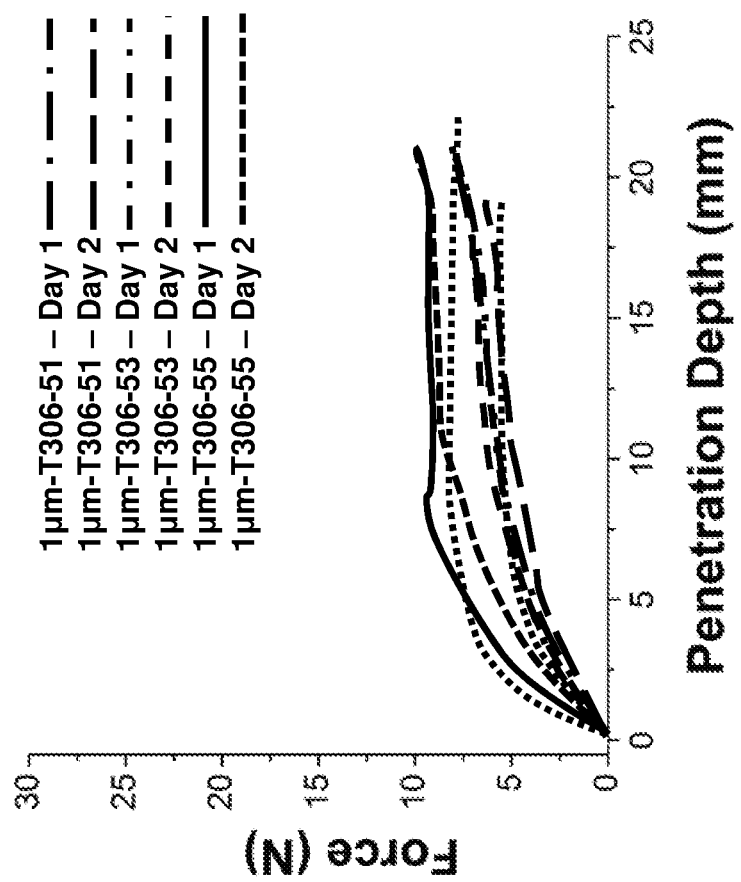
Figure 2C:
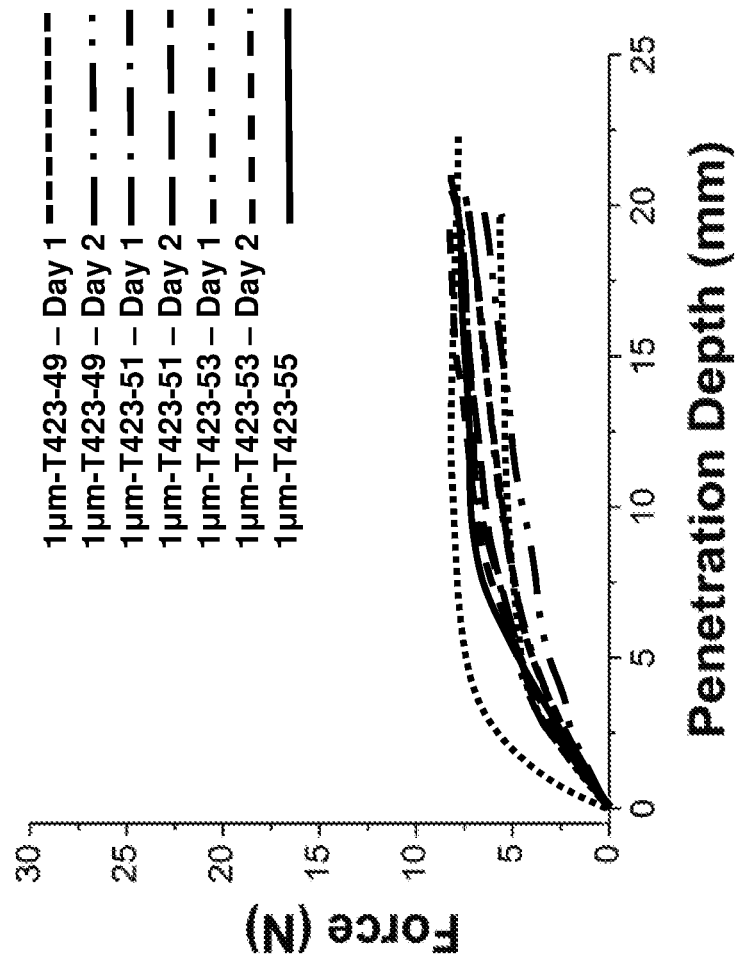

The indentation response of RP1 at 100° F. was measured to provide a comparison for the composites and initial targeted response range. RP1 was held at 100° F. for 48 hours prior to testing. It was then kneaded for 5 min prior to forming into a cube measuring 25 mm on each side. The sample was placed into the preheated oven and left for 15 min to allow the material to reach thermal equilibrium. The measurement was repeated with nine different samples to capture the approximate range of the RP1 response at 100° F. The PDMS-silica samples were kneaded for 5 min, formed into cubes measuring 25 mm on each side and were held at 72° F. for 15 min prior to testing. FIGS. 2A through 2C contains indentation data obtained from the composite samples containing 1 μm spherical silica particles. All materials composed of T208 exhibited much less resistance to indentation (lower measured normal force) than RP1 with a slight trend of increasing force required for indentation as the loading increased. Composites composed of T306 exhibited more resistance to indentation when compared to the same particulate loadings of T208 materials consistent with an increased polymer molecular weight and accompanying viscosity. The T306 samples that contain 51 and 53 vol % 1 μm silica particles, respectively, still provide a lower force relative to RP1. The sample composed of T306 with 55 vol % 1 μm silica spheres exhibits a slightly more rigid response than RP1 and could be considered a relatively good match to RP1 however, processing at 55 vol % may be problematic resulting in significant performance changes if there are slight fluctuations in the local concentration. When compared at the same particle concentration, samples composed of T423 exhibited a higher force required for indentation than the T208 samples but lower than the T306 which is counter-intuitive to the expected trend with polymer molecular weight. The T423 sample also did not show a clear trend with particle concentration. The relatively low indentation force of the T423 samples even at high particulate loading is attributed to the significant incorporation of air during processing that will provide a reduced resistance to indentation.

The samples were placed under vacuum for 48 hours in an attempt to remove the air however; the voids in the sample were still clearly visible. With reference to the disclosed compositions "composition" and "composite" are used interchangeably.

Figure 3B:
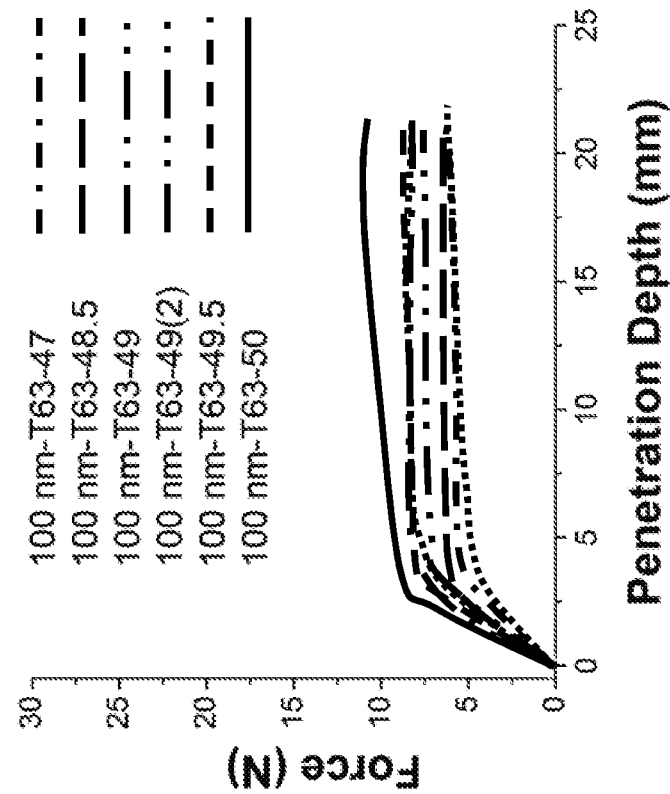
FIGS. 3A and 3B show the indentation response of materials composed of 100 nm silica spheres in a) T139 and b) T63 PDMS, respectively; the band delineated by dotted lines provides the range of responses obtained for RP1 at 100° F.
Figure 3A:
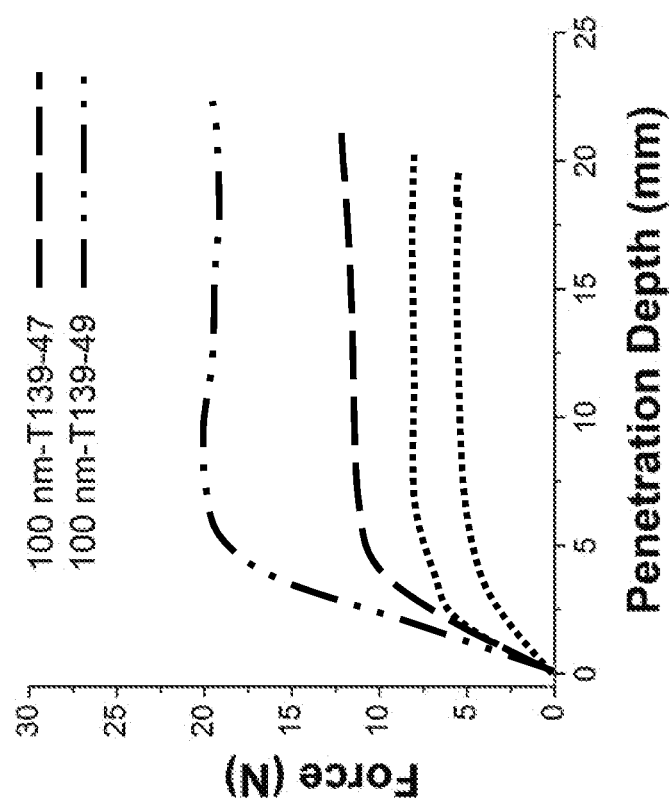

Samples composed of 100 nm particles exhibited significantly different behavior than those containing 1 μm particles. Samples composed of 100 nm particles typically became very rigid at lower particulate concentrations making it difficult to obtain a composition soft enough to match RP1 without exhibiting substantial tack adhesion. In particular, compositions composed of PDMS molecular weights above T208 were so sticky at a softness similar to RP1 that they were determined to be unusable. As a result, the study focused on composites composed of PDMS with molecular weights of 63,000 (T63) and 139,000 (T139) g/mol, respectively. Samples composed of 47 and 49 vol % 100 nm silica particles in T139 exhibited dimensional stability while still not being too sticky to handle. However, the force required for penetration was much higher than RP1 at 100° F. even at these relatively low particle concentrations (FIG. 3A). Samples composed of T63 exhibited good dimensional stability at loadings above 47 vol %. The indentation response obtained from samples composed of T63 demonstrated an indentation response very similar to RP1 at 100° F. at concentrations between 47 and 49.5 vol % 100 nm silica particles (FIG. 3B). While the sample composed of 50 vol % 100 nm silica particles in T63 exhibited a response just slightly above the targeted range. Samples were also produced composed of 100 nm silica particles in 28,000 g/mol PDMS however; dimensional stability was not obtained at any particle concentration.

The study demonstrates the critical role of the polymer molecular weight and particle surface area on the composite indentation response, and in particular, the study demonstrates the following non-limiting observations:

(A) At the same particle concentration, the 100 nm silica particles provide approximately 10 times the surface area of the 1 μm silica particles. The higher surface area provides more interaction with the surrounding polymer and has a larger impact on the viscosity as may be seen by the lower loadings required to obtain dimensional stability.

(B) The polymer molecular weight has a significant influence on the mechanical response, particularly when combined with high surface area particles. The most surprising aspect of this molecular weight study is that dimensional stability could be obtained using PDMS with viscosities of 100,000 cSt (T139) and 10,000 cSt (T63) but not when using a PDMS with a viscosity of 1,000 cSt (T28). This trend would indicate the importance of the molecular weight of entanglement ($MW_{ENT}$) on the ability to obtain dimensional stability. At a particular length (molecular weight) polymer chains are able to entangle with neighboring chains which results in the need for a concerted motion of multiple chains in an effort to flow. The T28 is below the PDMS $MW_{ENT}$ of 29,000 g/mol (see Gent, A., et al., "Experimental study of molecular entanglement in polymer networks," Journal of Polymer Science, Part B: Polymer Physics 32:271-279, incorporated by reference herein) whereas the T63 is just over twice the $MW_{ENT}$ and the T139 is over four times the $MW_{ENT}$.

Figure 4B:
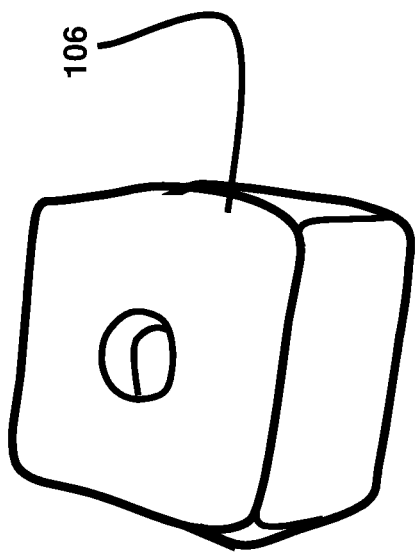
FIGS. 4A and 4B show the ball drop calibration testing arrangement the result of the ball drop calibration test performed on a composite composed of T63 and 47 vol % of 100 nm silica particles.
Figure 4A:
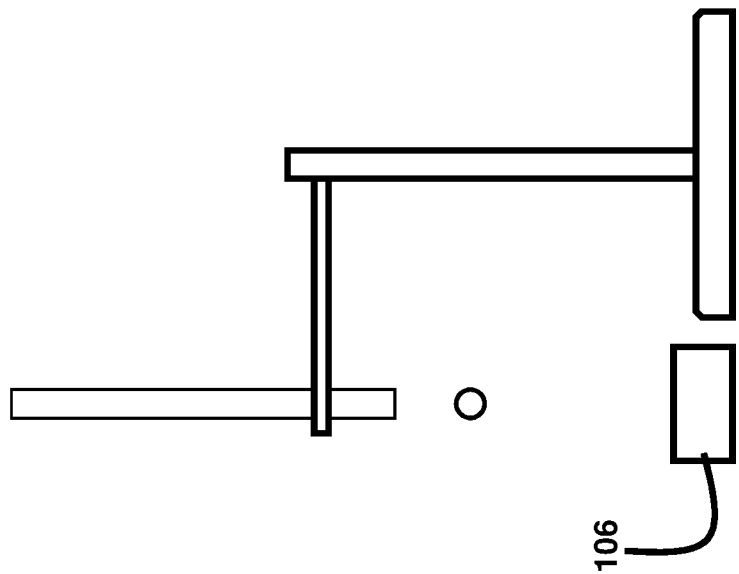

The indentation testing was useful to provide a comparison of these new composites at room temperature with the RP1 performance at 100° F. but it is a small scale test performed at relatively low rates. As a result, it is important not to focus too much of the development on the indentation response without determining how it correlates with more relevant test conditions. The production of a composite composed of T63 and 47 vol % of 100 nm silica particles was scaled up to 3 L to form a block 106 that was 5 inches on each side for the standard ball drop calibration test and enough material to fill in the indent to enable multiple tests. The ball drop calibration was performed three times resulting in measured indentations between 23 and 23.5 mm which is within the calibration range for RP1 at 25±3 mm (FIGS. 4A and 4B) demonstrating the feasibility of the approach and supporting the relevance of the indentation technique.

EXAMPLE 2

In this example, non-crosslinked PDMS mixed with fumed silica were studied. The materials used included non-crosslinked, methyl-terminated PDMS fluid purchased from Gelest Inc. (Morrisville, PA, USA). HS-5, M7D, and M5 grades of Cabot Chemicals fumed silica line were obtained from McCullough and Associates (Atlanta, GA, USA). All materials were used as received.

The test compositions or composites were produced using the following process. PDMS with a viscosity of 10,000 cSt and a molecular weight of approximately 63,000 g/mol (T63) was mixed with HS-5, M7D, and M5 fumed silica, respectively. The fumed silica and PDMS fluids were weighed out in the appropriate amounts to obtain the desired volume fraction of fumed silica and then mixed with a spatula to obtain a highly viscous paste. The paste was then passed through a ThermoFisher Process 11 twin screw extruder.

Figure 5A:
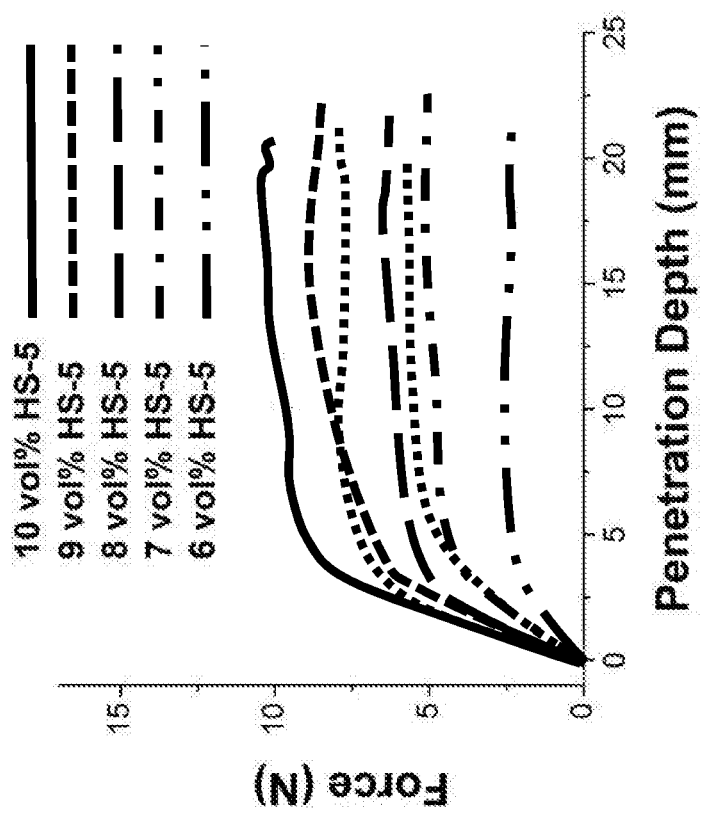
FIGS. 5A through 5C show the indentation response of materials composed of T63 and various loadings of HS-5, M5, and M7D fumed silica, respectively; the band delineated by dotted lines provides the range of responses obtained for RP1 at 100° F.
Figure 5B:
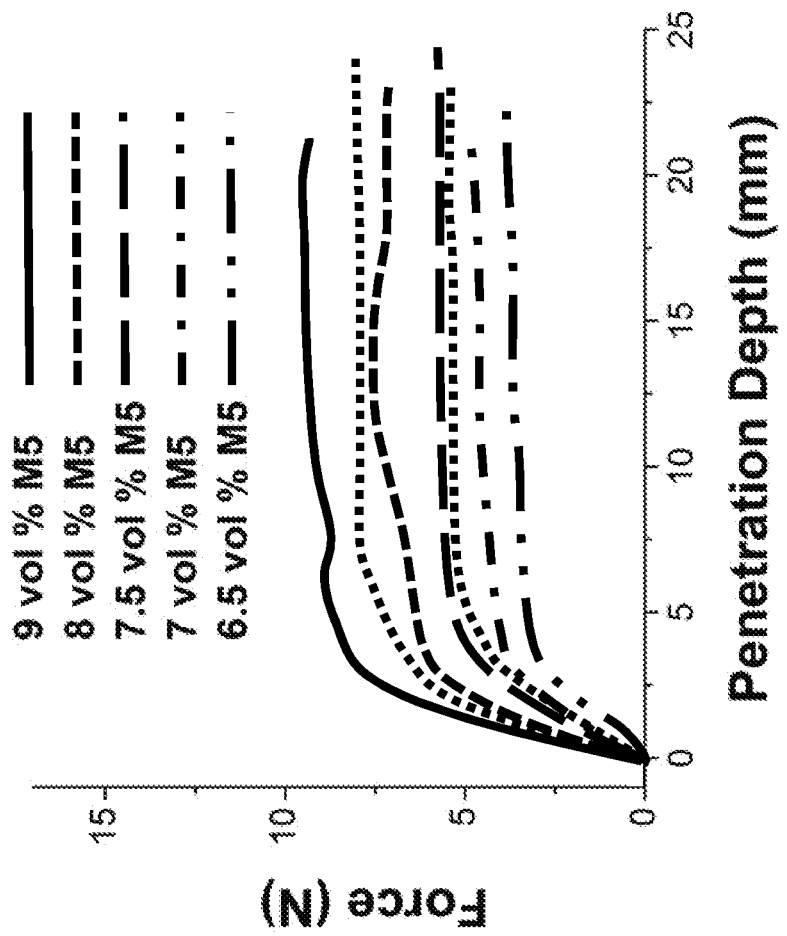
Figure 5C:
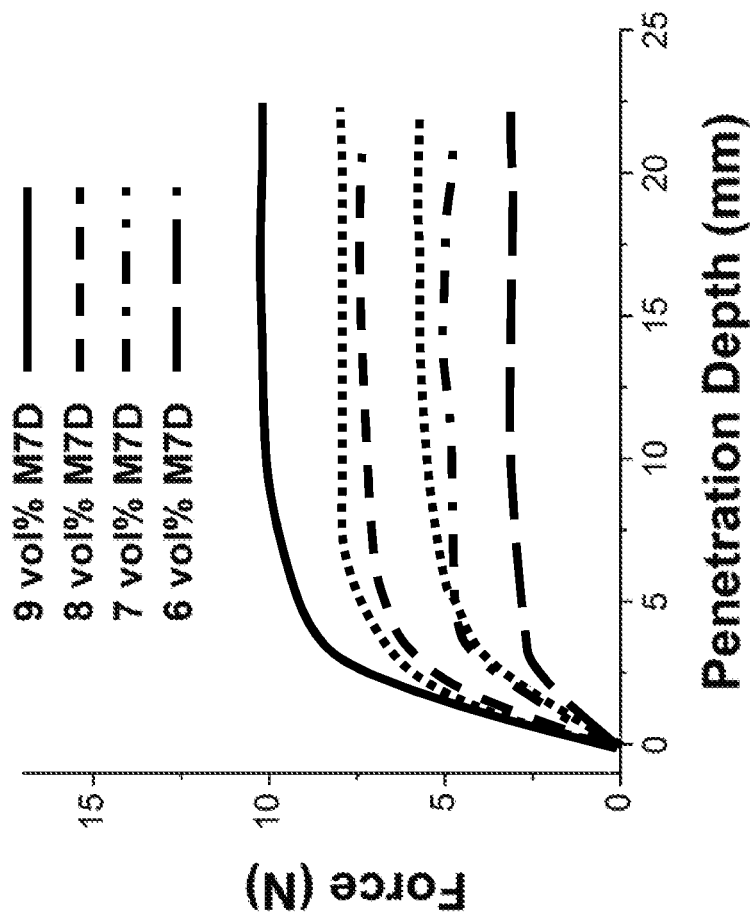

Results:

The monodisperse silica spheres are a relatively high-priced source of silica so it is advantageous to find a higher volume commercial source of silica that exhibits a high surface area. Fumed silica is commercially used as a thickening agent to modify viscosity. It is produced through flame pyrolysis resulting in the formation of droplets that are tens of nm in diameter that fuse together into branched chains forming a three-dimensional structure. This geometry provides very high surface area and a surface chemistry similar to the 100 nm spherical silica particles. The HS-5, M5, and M7D grades of CAB-O-SIL fumed silica were evaluated to determine if a response similar to RP1 at 100° F. could be obtained. FIGS. 5A through 5C provide the indentation response of T63 composites as a function of fumed silica grade and concentration. The composites required significantly lower concentration, in the range of 6 to 10 vol % to obtain dimensional stability. This is attributed by the increased particle surface area of the fumed silica relative to even the 100 nm spherical silica particles. Similar to the spherical silica composites, all of the fumed silica grades provide an increased resistance to indentation and higher required force with increased silica loading. In addition, a concentration range was identified for all three grades that was within the targeted response for RP1 at 100° F. This demonstrates that the fumed silica is a viable option for obtaining a viscoplastic or "clay-like" response.

EXAMPLE 3

In this example, the influence of particle surface chemistry was studied. The materials used included non-cross-linked, methyl-terminated PDMS fluid purchased from Gelest Inc. (Morrisville, PA, USA). SpectrAl® 100 and TS720 were obtained from Cabot Chemical (Boston, MA, USA). Aerosil® A380 was obtained from Evonik Industries (Essen, North Rhine-Westphalia, Germany). Calcium carbonate powder (of 30 μm or less in size) was obtained from Sigma Aldrich (St. Louis, MO, USA). All materials were used as received.

The composites used in this example were produced according to the following procedure. The particles and T63 PDMS fluid were weighed out in the appropriate amounts to obtain the desired volume fraction of silica and then mixed with a spatula to obtain a highly viscous paste. The paste was then passed through a DSM Xplore conical twin screw extruder with the recirculation path closed in an effort to maintain a consistent residence time. After the first pass, the extrudate was mixed together and extruded for a second pass to obtain uniform mixing.

Results:

The particle surface chemistry is anticipated to play a significant role on the material response particularly when using particles that exhibit a high surface area. The surface chemistry of the silica spheres and fumed silica used in previous studies included the as-produced surfaced chemistry composed of hydroxyl functionalities. The hydroxyl functionality is capable of reversibly hydrogen bonding with adjacent silica particles and even the polymer to form a secondary network that may be disrupted and reformed. This enhances the material dimensional stability at rest, allows for plastic flow during deformation, and then regaining dimensional stability after the deformation has stopped. Four different particles were evaluated to gain insight into the role of particle surface chemistry.

The Fumed Alumina (SpectrAl® 100) was similar size and geometry as the fumed silica but was composed of an aluminum oxide. The surface chemistry is also composed of hydroxyl functionalities but at a lower concentration than fumed silica. The treated Fumed Silica (TS 720) was fumed silica that has been treated to convert some of the hydroxyl functional groups to short PDMS chains. This change in surface chemistry results in a more hydrophobic surface and reduces the ability for the particle to hydrogen bond. The calcium carbonate ($CaCO_3$) was composed of roughly cubic particles that are not expected to exhibit any significant hydrogen bonding character. The Aerosil® A380 was tested to verify the availability of an alternative vendor of suitable fumed silica.

Figure 6A:
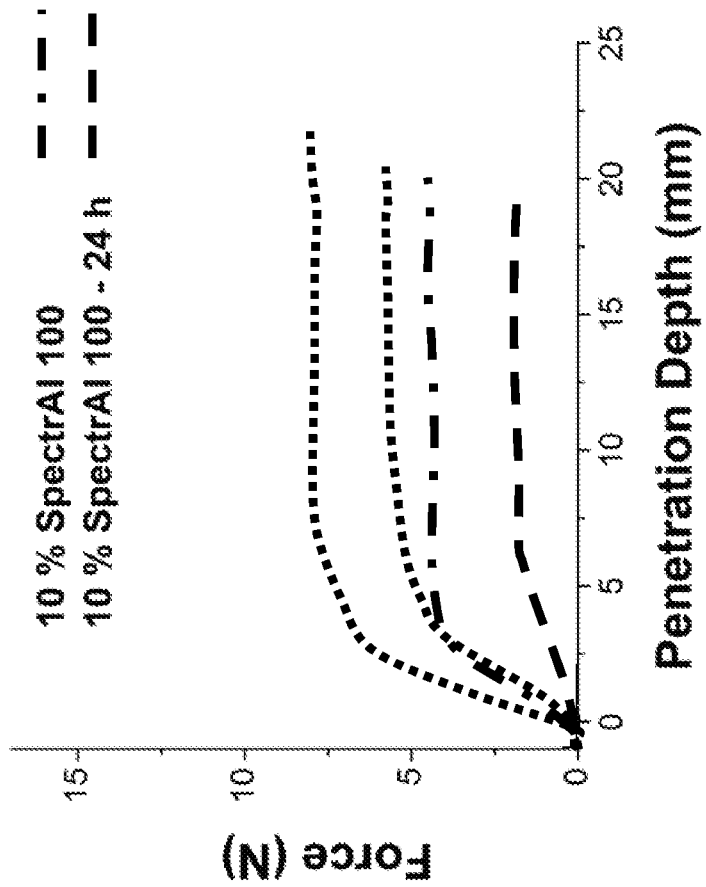
FIGS. 6A through 6C show the indentation response of materials composed of T63 and SpectrAl® 100, TS720, and Aerosil® A380, respectively; the band delineated by dotted lines provides the range of responses obtained for RP1 at 100° F.
Figure 6B:
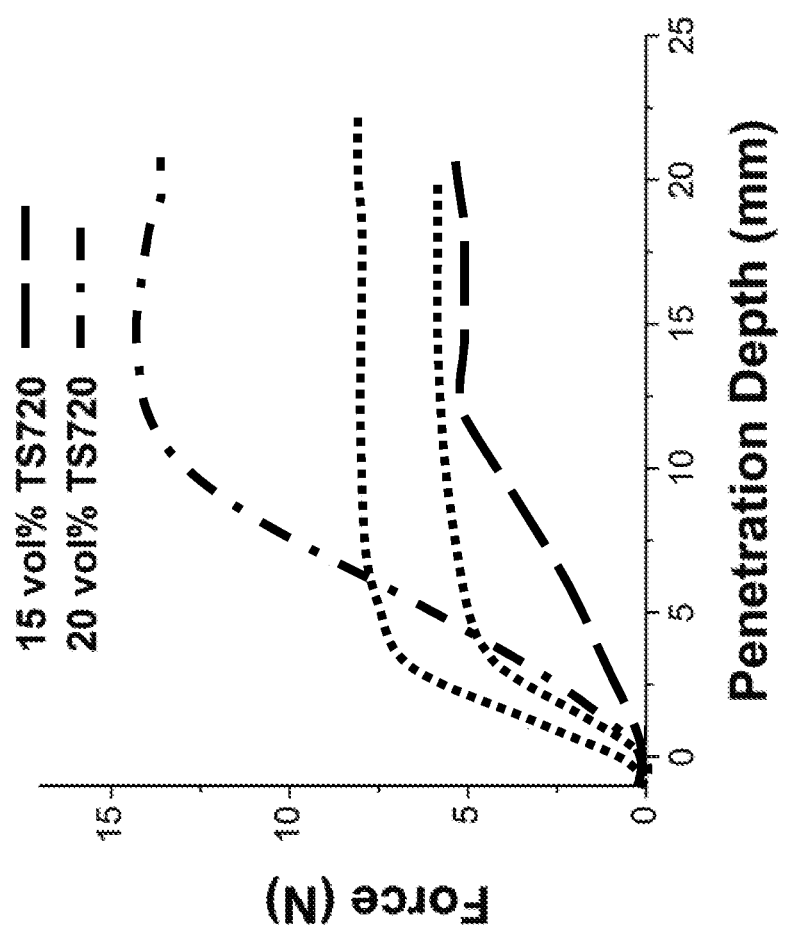
Figure 6C:
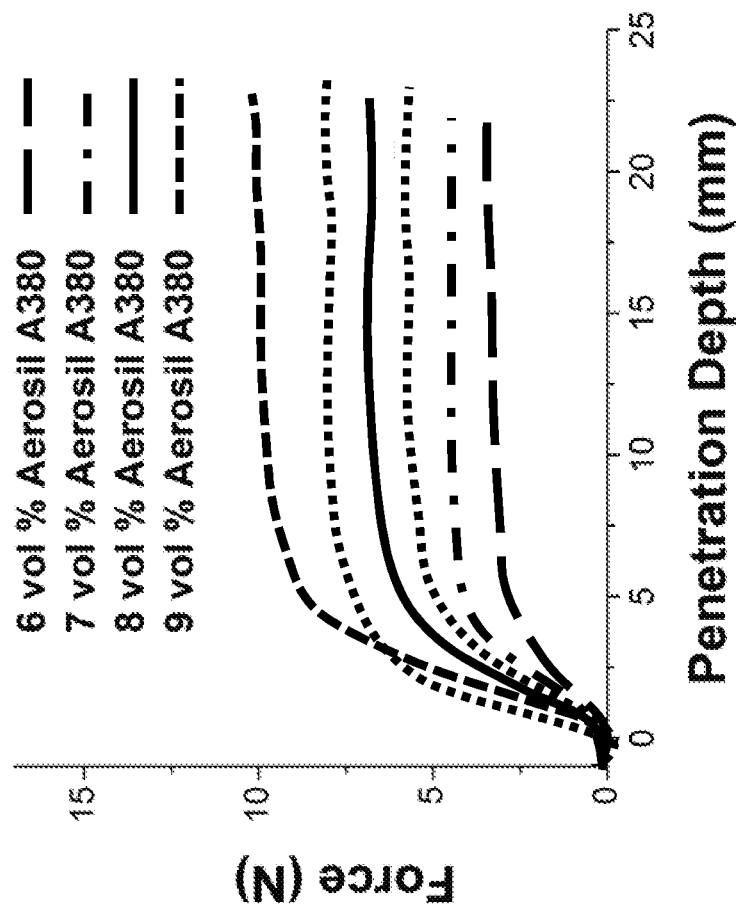

The particle concentration of SpectrAl® 100, TS720, and $CaCO_3$ was increased in 5 vol % increments until the composites exhibited qualitative dimension stability and was then tested using indentation. Composites composed of $CaCO_3$ did not exhibit sufficient enough dimensional stability to perform the indentation testing at any concentration. The SpectrAl® 100 exhibited dimensional stability at a concentration of 10 vol % which is only slightly higher than the fumed silica from the previous study. The shape of the indentation response was similar to RP1 at 100° F. with a normal force in the plateau region that was approximately 2 N too low (FIG. 6A). This was initially promising however, after 24 hours the material became substantially softer. The mechanism for the softening is not readily apparent however the time-dependent changes cannot be tolerated for this application. Materials composed of TS720 began exhibiting dimensional stability at a concentration of 15 vol %. However, the materials composed of TS720 exhibited a small degree of noticeable elastic recovery during compression. This elastomeric behavior was captured in the indentation response (FIG. 6B) where the initial loading portion of the response is much larger (higher indentation depths) and exhibits curvature consistent with an elastomer. The increased elastic recovery may be attributed to the PDMS surface functionality of the TS720 increasing the interaction of the particles with the PDMS polymer resulting in a low concentration of effective crosslinks. This explanation is supported by the behavior becoming more pronounced at higher particle loadings. The Aerosil® A380 provided a similar response at equivalent loadings to the other fumed silica testing indicating that the combination of high surface area and native surface chemistry is not limited to the Cabot chemical product lines (FIG. 6C).

This study demonstrates the critical role of chemistry on the particle surface. Composites composed of particles exhibiting a reduced (SpectrAl® 100) or negligible ($CaCO_3$) concentration of hydroxyl functionality were not able to reproduce the desired response. In addition, functionalizing the surface chemistry to provide reduced hydroxyl functionality and enhanced interaction with the polymer produced an undesired elastomeric response. While this effect was demonstrated using hydroxyl groups capable of hydrogen bonding a similar effect is expected when using other noncovalent bonding mechanisms including ionic interactions and metal coordination.

EXAMPLE 4

Figure 7:
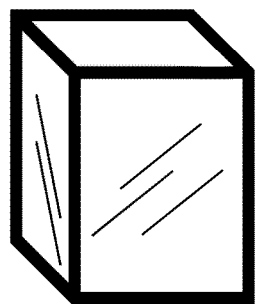
FIG. 7 shows a view of a composite composed of T63 containing 7.5 vol % M7D to demonstrate its translucent appearance.
Figure 8B:
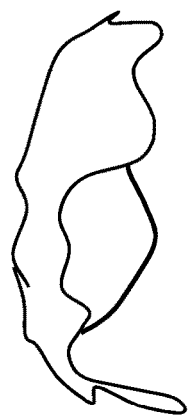
FIGS. 8A and 8B show schematic representations for a similar indentation in RP1 and a fumed silica-PDMS composite, respectively, obtained using a FARO arm laser scanner.
Figure 8A:

In this example, arm laser compatibility using a particulate detackifier was studied. The current protocol for BFD analysis uses a FARO® arm laser scanner to precisely reproduce the surface of the backing material. The as-produced fumed silica-PDMS composites are translucent as a result of the largest size feature being near or smaller than the wavelength of light (FIG. 7). That translucent appearance may complicate the analysis with a FARO® arm laser. FIGS. 8A and 8B provide example schematics of an RP1 clay surface that is an opaque grey-green compared to a similar scan of the fumed silica-PDMS. Scans of the fumed silica-PDMS provided a measurement that was 8 mm below the true surface of the material due to the laser light penetrating into the material before being scattered back to the detector.

Figure 9B:
FIGS. 9A and 9B show topography schematic representations of a composite containing fumed silica, PDMS, and corn starch before and after indentation, respectively, obtained using a FARO arm laser scanner.
Figure 9A:
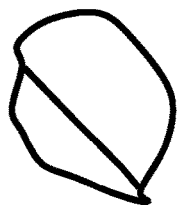

The fumed silica-PDMS composites also exhibited a high amount of tack adhesion that may hinder material handling and distort a BFD measurement if the target adheres to the backing material. A third component was added to the material to reduce the tack adhesion of the composite. The detackifying agent was a particulate, corn starch, rather than the more common liquid detackifiers to limit any phase separation that would change the material performance over time. The corn starch has an average particle size of approximately 10 µm which is much larger than the wavelength of light to promote FARO® arm laser compatibility. The corn starch was added in 50 g increments to 120 mL of already processed composite composed of T63 containing 7.5 vol % M7D fumed silica. At 150 g of added corn starch the tack adhesion was dramatically reduced and the material still exhibited a viscoplastic response. The composite containing corn starch was readily able to be scanned using the FARO® arm laser scanner before and after indentation (FIGS. 9A and 9B).

EXAMPLE 5

Figure 10:
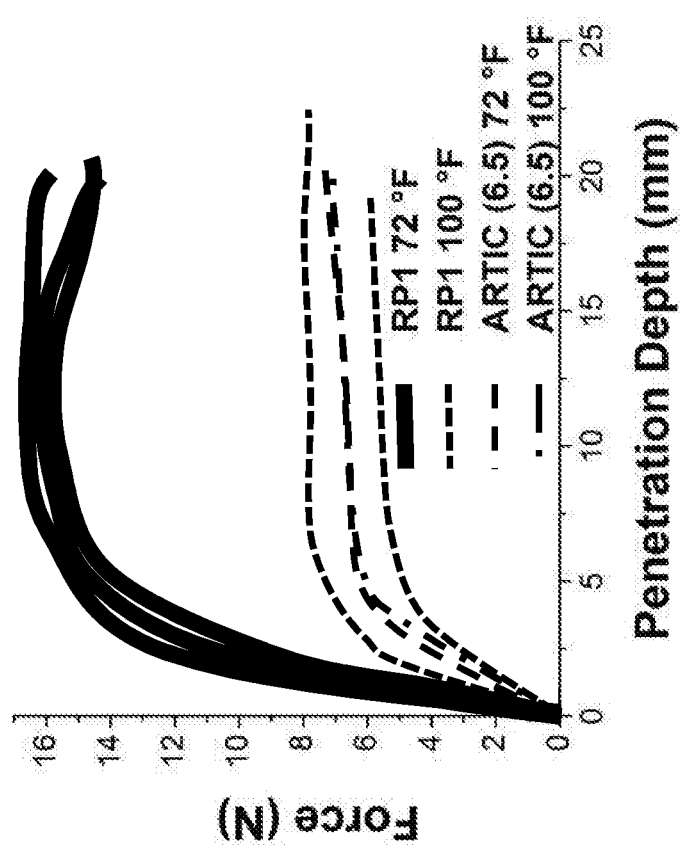
FIG. 10 shows the indentation responses of RP1 and ARTIC 6.5 at 72° F. and 100° F., respectively.

In this example, PDMS, fumed silica, and corn starch composites with minimal temperature dependence around room temperature were studied as a drop-in replacement for RP1. A composite composed of 4.8 vol % M7D, 36.2 vol % corn starch, and 59 vol % PDMS was produced using a 16 mm twin screw extruder with an L/D of 40. The mixing profile of the screw and loading rate was adjusted such that the resulting composite had an average response of 6.5 N in the plateau portion of the indentation curve. The material will be labeled as ARTIC 6.5 for brevity. The designation ARTIC derives from Army Reusable, Temperature-Independent Clay. The material was tested at room temperature (72° F.) and 100° F. to determine the temperature sensitivity relative to RP1. FIG. 10 provides indentation testing as a function of temperature for both RP1 and ARTIC 6.5. The indentation data demonstrates the significant temperature dependence of RP1 where a decrease in temperature from 100° F. to 72° F. results in greater than two-fold increase in the force required for indentation. In contrast, the indentation response of ARTIC 6.5 is nearly indistinguishable at the two test temperatures indicating a reduced temperature dependence that is desirable for this application.

Figure 11B:
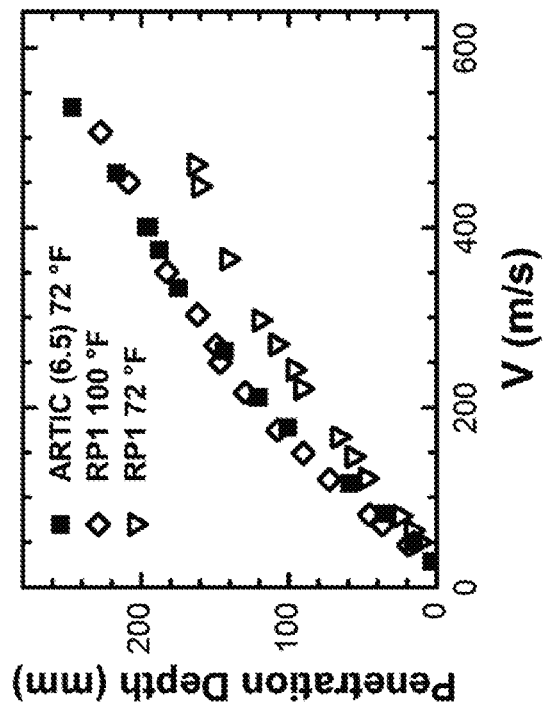
FIGS. 11A and 11B show plots of 5.56 mm spherical projectile penetration as a function of velocity for A) ARTIC 6.5 at 72° F. and 100° F. and B) ARTIC 6.5 at 72° F. compared to RP1 at 100° F. and 72° F., respectively.
Figure 11A:
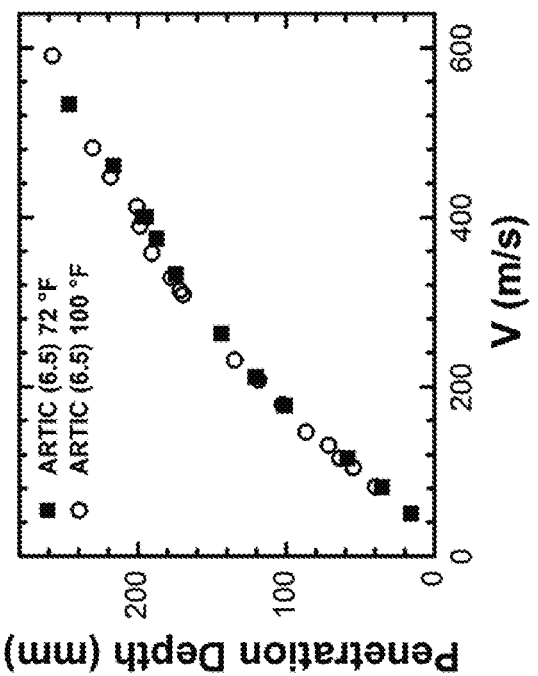

The indentation testing has been a very useful test in determining the critical material parameters required to obtain the desired response however it is still a relatively low strain rate test for a high strain rate application. To gain insight into the higher rate response, the ARTIC 6.5 was impacted with 5.56 mm spherical projectiles at rates of 50 to 600 m/s and the depth of penetration was determined using a long needle. The sample chamber was equipped with an environmental chamber to enable temperature-dependent testing. The ARTIC 6.5 exhibited very similar penetration behavior at both 72° F. and 100° F. (FIG. 11A). The penetration response of ARTIC 6.5 also provided a good match to RP1 at 100° F. in the entire velocity range tested (FIG. 11B). RP1 was also tested at 72° F. resulting in significantly reduced penetration depths consistent with the increased rigidity of the material at lower temperatures. This data supports the viability of using ARTIC 6.5 as an RP1 replacement at room temperature in a high strain rate application.

Figure 13:
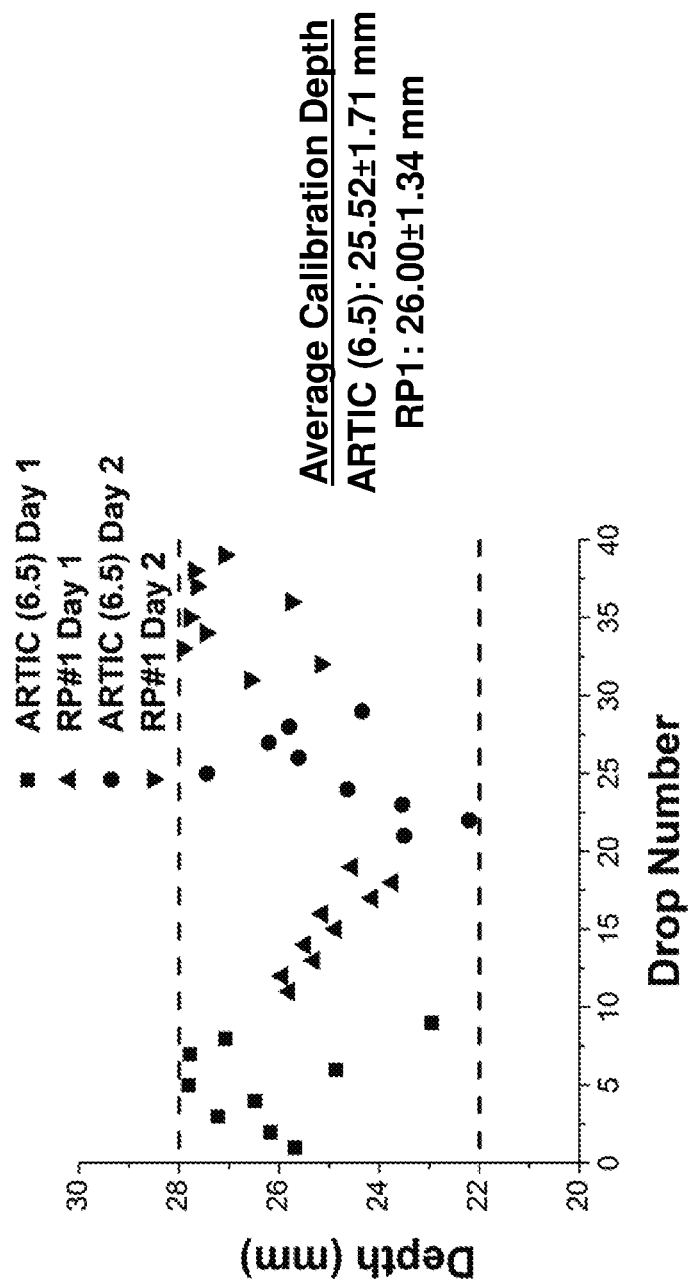
FIG. 13 shows ball drop calibration depths obtained for ARTIC 6.5 at room temperature and RP1 at 100° F. taken over the course of two days separated by 1 week.

The ideal RP1 replacement material would match the current ball drop calibration test and be used with the current RP1 infrastructure. To determine the utility of ARTIC 6.5 with current RP1 test methods, 200 pounds of material was fabricated for evaluation. The evaluation was carried out by placing 2 to 3 inch balls 108 of the material into a 24×24×5.5 inch test box 110 and the balls were impacted to fill the box without leaving any air voids (FIGS. 12A through 12C). The box 110 is overfilled and then a blade is pulled across the top of box 110 to "strike" a flat surface. The box was then X-rayed to determine the presence of any air voids that may influence the BFD measurements. The procedure was the same as used with RP1 and the evaluation suggested that the material largely behaves the same as RP1 with a few small differences that did not require dramatic changes to accommodate. The packed test boxes 110 were then tested using the standard ball drop calibration. The test uses a 1 kg weight dropped from a set height so as to achieve a velocity of 6 m/s at the point of impact. The box 110 is considered in calibration if the ball drop depth falls in a range of 25±3 mm. The ARTIC 6.5 block was tested at room temperature and compared to an RP1 block at 100° F. over two days spaced 1 week apart. All of the ARTIC 6.5 ball drop values fell within calibration providing an average response over the two days of 25.52±1.71 mm compared to the RP1 block with an average response of 26±1.34 mm (FIG. 13). There were no apparent trends in the data between the two days that would indicate there is a substantial temperature dependent change over the one-week duration.

EXAMPLE 6

Figure 14A:
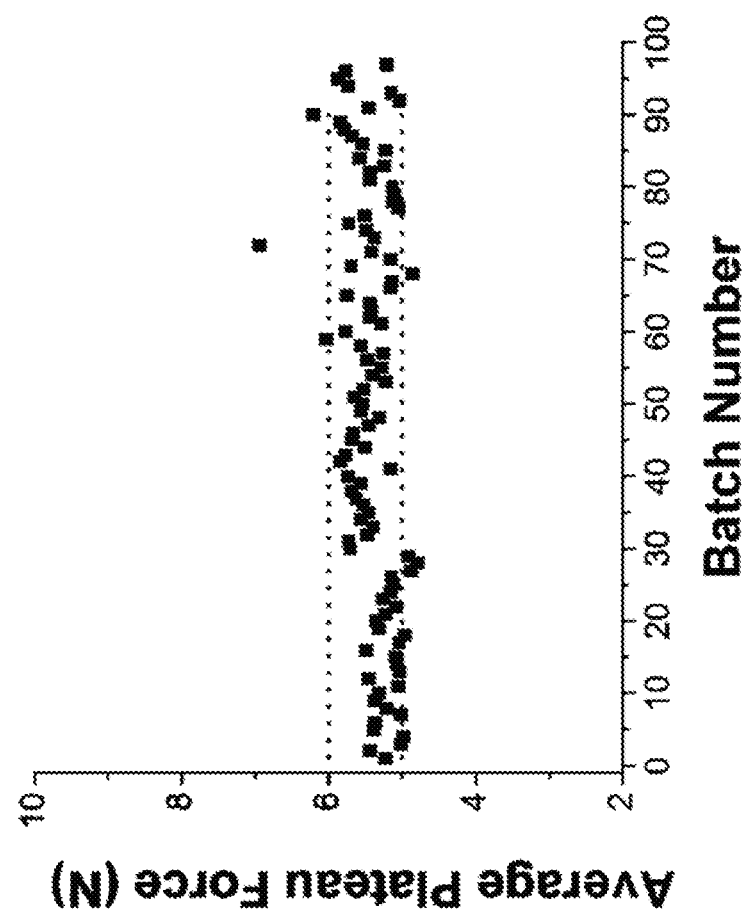
FIGS. 14A through 14C show batch variability data obtained from the average plateau force value of the indentation response for A) ARTIC 5.5, B) ARTIC 6.5, and C) ARTIC 8.
Figure 14B:
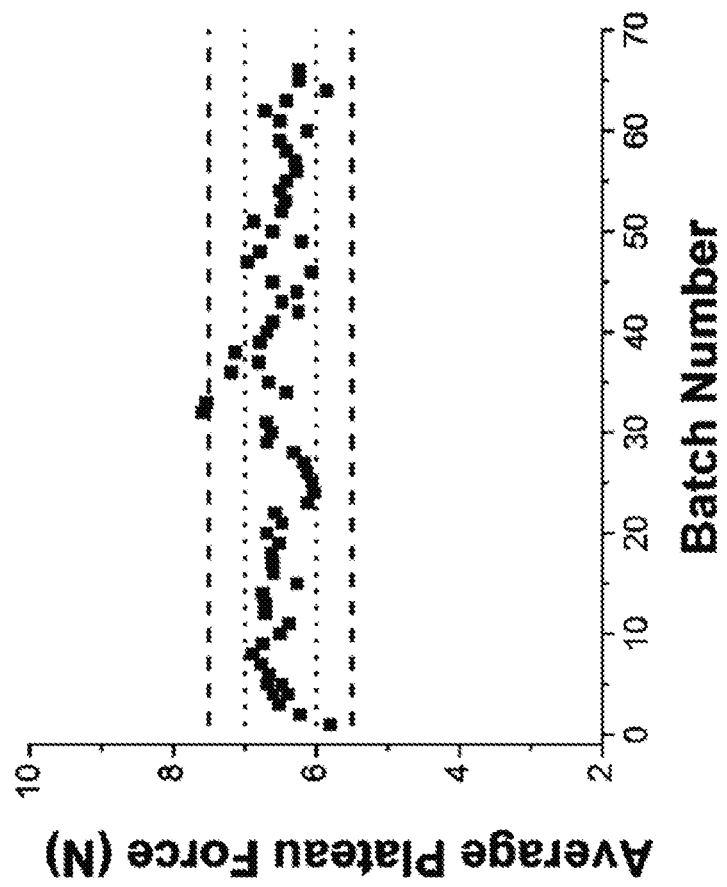
Figure 14C:
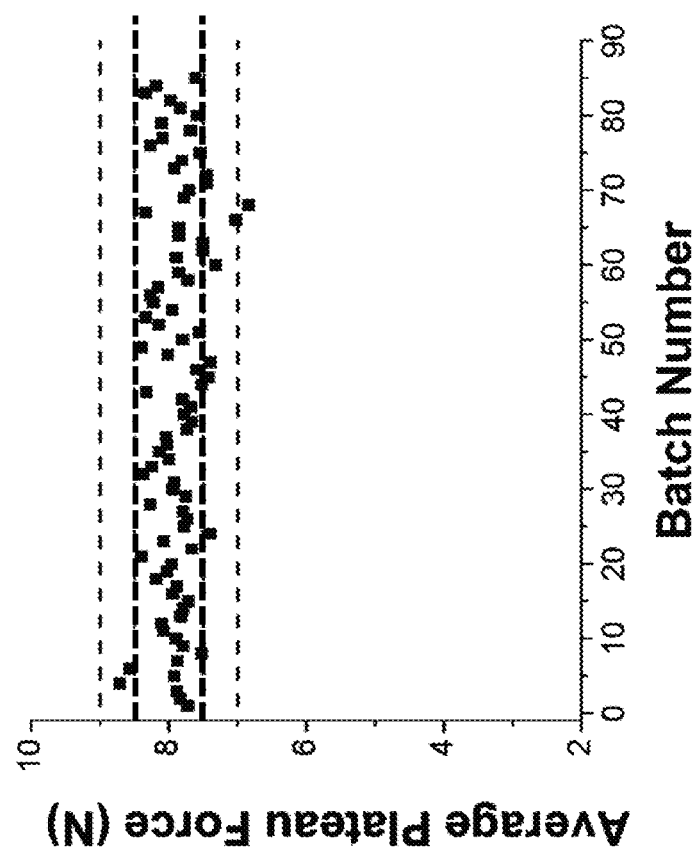

In this example, tailoring the ballistic response of exemplary embodiments of the disclosed compositions by using the fumed silica content was studied. An important aspect of examples of the disclosed compositions is that they perform similar to RP1 at 100° F. under ballistic test conditions. In addition, it is important to know how to tailor the response of the new material to either provide a closer match to RP1 or to meet the future needs of the testing community. The material response was tailored by keeping the corn starch content constant and varying the ratio of fumed silica to PDMS and targeting responses in the indentation plateau region of 5.5, 6.5, and 8 N. The formulation details are provided in Table 1. The material was produced in multiple batches and indentation was performed on each batch to gain insight on batch to batch reproducibility. The individual batch data is provided in FIGS. 14A through 14C along with dotted lines denoting the targeted variability range of less than ±0.5 N with a guide for the eye in the plots for the stiffer formulations at ±1.0 N. Table 2 provides the average response and standard deviation of the variability data and demonstrates that the average forces are within 0.11 N of the targeted value and all of the standard deviations were around 0.3 N.

TABLE 1

Formulation details of materials evaluated with ballistic testing:

| Name | M7D Fumed Silica (vol %) | T63 PDMS (vol %) | Corn Starch (vol %) |
|---|---|---|---|
| ARTIC 8 | 5.1 | 58.7 | 36.2 |
| ARTIC 6.5 | 4.8 | 59.0 | 36.2 |
| ARTIC 5.5 | 4.3 | 59.5 | 36.2 |

TABLE 2

Summary of batch reproducibility for the three ARTIC formulations:

| Name | Targeted Range | Average | Std. Dev. |
|---|---|---|---|
| ARTIC 8 | 8 ± 0.5 N | 7.89 | 0.31 |
| ARTIC 6.5 | 6.5 ± 0.5 N | 6.50 | 0.27 |
| ARTIC 5.5 | 5.5 ± 0.5 N | 5.39 | 0.28 |

Figures 15A, 15B:
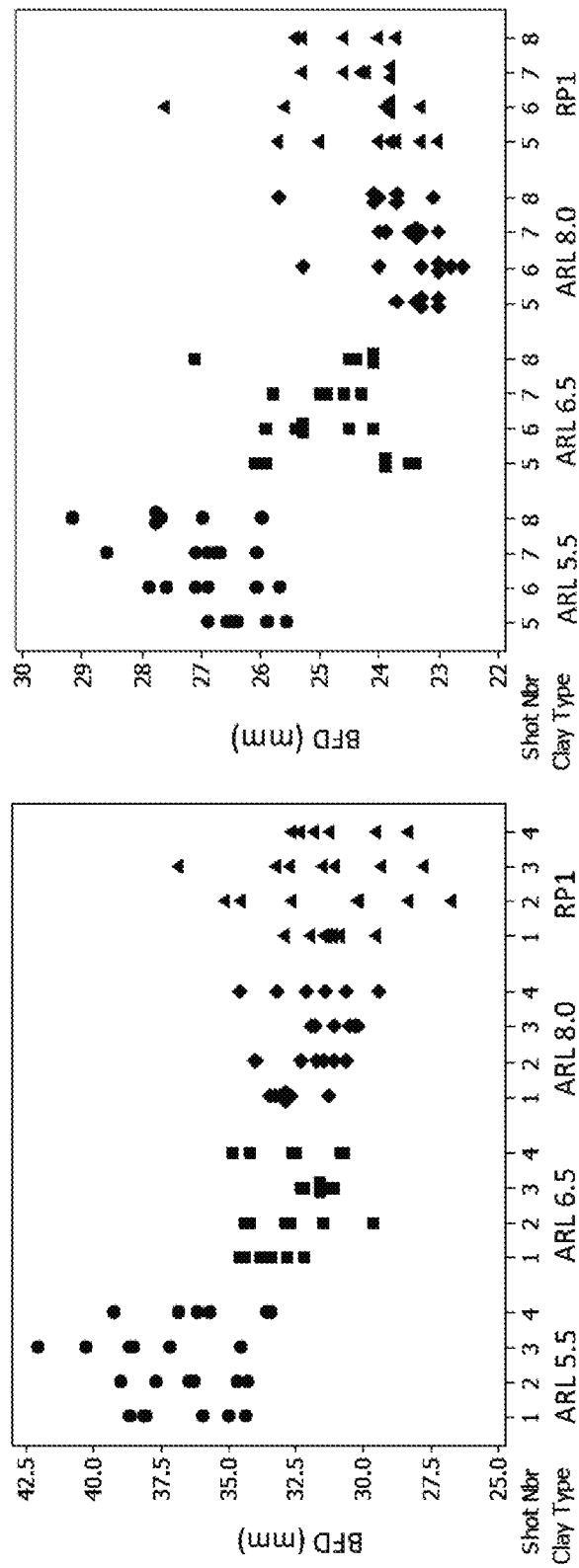
FIGS. 15A and 15B show ballistic BFD data for ARTIC 5.5, ARTIC 6.5, and ARTIC 8 at room temperature compared to RP1 at 100° F. shot at A) 0° and B) 30° obliquity, respectively.

The three formulations were tested using soft armor composed of multiple stacked sheets of Kevlar® material shot with a 9 mm full metal jacketed round at a velocity where penetration should not be observed. Each block was shot eight times with four at 0° obliquity and four at 30° obliquity per test. At the conclusion of each shot the indentation was scanned using the FARO® arm laser scanner to record the BFD. The indentations were then filled with additional material and the test was repeated. The measured BFD for all the formulations are included in FIGS. 15A and 15B along with BFD values for RP1 at 100° F. obtained at the time of testing. The data shows that at both 0° and 30° obliquity the ARTIC 5.5 formulation provides a BFD that is deeper than RP1 consistent with a more compliant material. The ARTIC 6.5 and ARTIC 8 formulation provided good matches to the BFD values obtained using RP1 at 100° F. at 0° obliquity. The ARTIC 6.5 provided a better match to RP1 at 100° F. than the ARTIC 8 at 30° obliquity but both materials provided a suitable response.

Figure 16A:
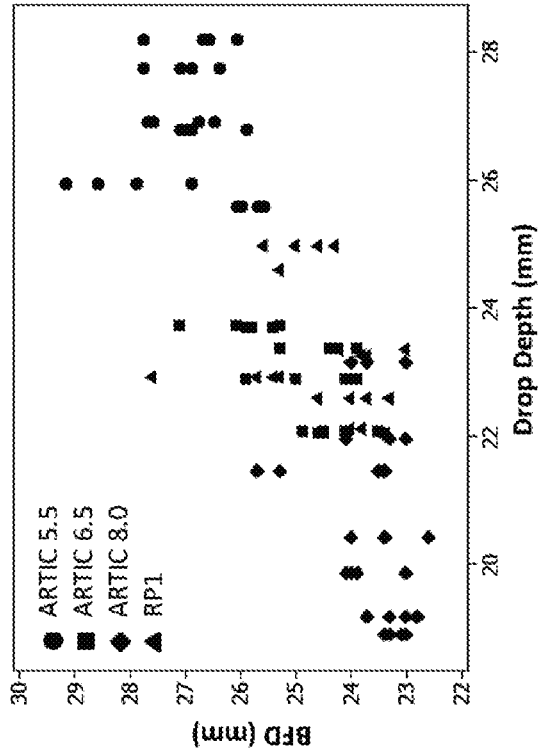
FIGS. 16A and 16B show ballistic BFD data as a function of ball drop calibration depth for ARTIC 5.5, ARTIC 6.5, and ARTIC 8 at room temperature compared to RP1 at 100° F. shot at A) 0° and B) 30° obliquity, respectively.
Figure 16B:
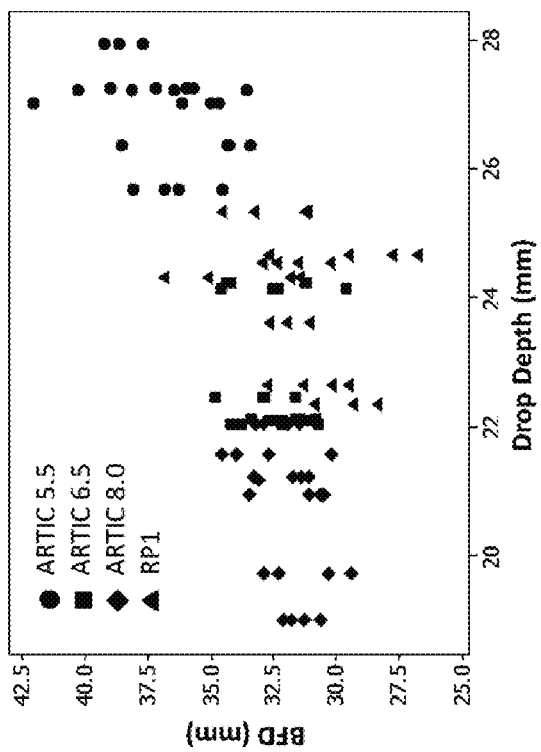

Ball drop testing was performed on the test boxes prior to BFD testing to determine whether the calibration test developed for RP1 may also be utilized for these new materials. FIGS. 16A and 16B present the BFD data plotted against the ball drop calibration depths for all of the new material formulations at room temperature and RP1 at 100° F. The data reveals a clear trend between the ball drop calibration depth and the plateau force of the three new materials where the softest material exhibits the largest calibration depth and the most rigid exhibits the lowest drop depth. This data demonstrates that the ARTIC 6.5 formulation provides a close match to the RP1 at 100° F. both in the ball drop calibration values and the BFD response. Also interesting is that the ARTIC 8 formulation exhibited ball drop values that would be considered too low to be within calibration however it still provides a BFD response similar to RP1. In contrast, most of the ARTIC 5.5 ball drop values would fall within calibration but it provides BFD values that are too large. This data indicates that the ball drop calibration test currently used for the RP1 may be used to evaluate these new materials, but the calibration range may need to be reevaluated. In addition, the data indicates that the BFD values are less sensitive on the more rigid end of the new material response.

The BFD response seems to follow trends in the plateau values of the quasi-static indentation testing. Typically, it is difficult to predict high rate response from a quasi-static test; however, these materials appear to exhibit a very low strain rate dependence. FIG. 17 plots the average plateau force against the measured ballistic BFD. The plot includes data from five different test boxes that have undergone ballistic testing. While the plot may not be perfectly linear there is a clear trend in the data that may allow the material to be modified for a specific BFD response. The portion of the plot delineated by the vertically elongated rectangle is the range of RP1 BFD values that have been measured at the time of the new material testing; however, the historic value for RP1 BFD in this test geometry is 31.7 mm. This plot indicates that a plateau force range of 6.0 to 8.5 would likely provide a similar response to RP1 at 100° F.

FIG. 18, with reference to FIGS. 1A through 17, is a flow diagram illustrating a method of forming a composition of matter, according to an embodiment herein. The method comprises providing (501) a non-crosslinked polymer; dispersing (503) a particulate material within the non-crosslinked polymer; and forming (505) the composition of matter containing the non-crosslinked polymer and the particulate material, wherein the composition of matter comprises a viscoplastic property. The method may further comprise adding (507) a particulate detackifying agent to the composition of matter.

The non-crosslinked polymer may comprise any of a silicon based polymer compound, an organo silicon polymer compound, at least one polysiloxane, polydimethylsiloxane, and methyl terminated polydimethylsiloxane. The non-crosslinked polymer may comprise at least one polymer compound having a molecular weight of entanglement ($MW_{ENT}$), wherein the polymer compound may have an average molecular weight in the range of from about two to about five times the $MW_{ENT}$.

The non-crosslinked polymer may comprise at least one polymer compound, and wherein the polymer compound has an average molecular weight in the range of from about 63,000 g/mol to about 432,000 g/mol. The polydimethylsiloxane may comprise an average molecular weight in the range of from about 63,000 g/mol to about 306,000 g/mol. The non-crosslinked polymer may comprise any of polybutadiene, polyisoprene, poly(ethylene-co-butadiene), poly (ethylene-co-propylene), and polyisobutylene. The particulate material may be selected from the group consisting of fumed silica, monodisperse silica spheres, fumed alumina, and mixtures thereof. The particulate material may comprise particles of a size in the range of from about 10 nm to about 1 µm.

The particulate material may comprise particles having a surface chemistry such that the particles form non-covalent bonds with other the particles or with the non-crosslinked polymer or with both other the particles and the non-crosslinked polymer. The composition of matter may comprise from about 2 to about 55 percent by volume of the particulate material. The composition of matter may comprise from about 28 to about 98 percent by volume of the non-crosslinked polymer. The composition of matter may comprise from about 45 to about 98 percent by volume of the non-crosslinked polymer.

The composition of matter may comprise from about 51 to about 96 percent by volume of the non-crosslinked polymer. The composition of matter may further comprise a particulate detackifying agent. The detackifying agent may comprise an average particle size of about 10 µm. The detackifying agent may comprise corn starch. The composition of matter may comprise about 36.2 percent by volume of the detackifying agent. The composition of matter may have an indentation response curve with an average plateau force that remains within plus or minus 1.0 N of a target force.

Examples of the disclosed compositions provide a new test medium that is specifically designed to meet the current and future needs of the body armor testing community and does not exhibit many of the issues associated with RP1. The material exhibits a consistent response from at least 50° F. to 100° F. The material passes the ball drop calibration test for RP1 and exhibits a similar ballistic response to RP1 while at room temperature. The material consists of only three components allowing for precise quality control and the formulation to be altered to tailor the BFD for the any future needs of the testing community.

Exemplary embodiments of the disclosed compositions provide new materials for the measurement of the behind armor backface deformation (BFD) during armor development, evaluation, and certification. The material eliminates the temperature-dependence associated with the current ballistic clay (Roma Plastilina #1, RP1) that currently needs to be heated to 100° F. and may only be used for 45 min before the material is considered out of calibration due to a strong temperature dependent response.

There have been other efforts to develop a replacement for RP1 that may be used at room temperature, but those efforts were unsuccessful. Many other clay-like materials were evaluated but did not provide the desired response, environmental stability, or stable response with time. The disclosed compositions may be used for the measurement of ballistic BFD for armor certification, evaluation, and development, according to some examples. The material exhibits a unique energy dissipation character which could be used for mechanical damping and armor applications. The material also has the properties of modeling clay and could offer a sulfur-free alternative to the artistic community or for children's toys. Examples of the disclosed compositions provide entirely new backing materials that meet the needs of the armor development community for a replacement for the current ballistic clay, RP1. The backing material provides various characteristics including: the materials provides the desired response at room temperature eliminating the need for heating; the materials exhibit a response that is not dependent on temperature within at least ±20° F.; the materials have no detectable odor as compared to the distinct sulfur odor of RP1; the materials are composed of 2 or 3 components with known impact on the performance to improve quality control and facilitate modification of the response to meet changing needs; and the three components are commodity materials with large production values, thus reducing supply chain issues.

The new materials disclosed herein provide the targeted response of RP1 at 100° F. when tested at room temperature using indentation, compression, spherical projectile penetration, ball drop calibration, and ballistic BFD testing methods. The materials exhibit a consistent response in at least the temperature range of 50° F. to 100° F. and may be used with the current RP1 infrastructure to provide a drop-in replacement. Testing results and additional details of embodiments of the present invention are described in an article titled "Mechanical properties of silicone based composites as a temperature insensitive ballistic backing material for quantifying back faced deformation" Tara D. Edwards et al. in Forensic Science International 285 (2018) 1-12 which is hereby incorporated by reference herein.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A composition of matter comprising:
a non-crosslinked polymer fluid comprising at least one polymer compound having a molecular weight of entanglement ($MW_{ENT}$), and wherein the polymer compound has an average molecular weight in the range of from about two to about five times the $MW_{ENT}$,
a particulate material that forms a reversible interparticle network through hydrogen bonding dispersed within the non-crosslinked polymer, and
a component for reducing adhesion of the composition,
wherein the composition of matter comprises a viscoplastic property and minimal elastic response over the desired usable temperature of 50 F to 100 F,
and wherein the composition of matter has an indentation response curve with an average plateau force that remains within plus or minus 1.0 N of a target force.

2. The composition of matter of claim 1, wherein the non-crosslinked polymer fluid is selected from the group consisting of a silicon-based polymer compound, an organosilicon polymer compound, polysiloxane, polydimethylsiloxane, and methyl-terminated polydimethylsiloxane.

3. The composition of matter of claim 2, wherein the polydimethylsiloxane comprises an average molecular weight in the range of from about 63,000 g/mol to about 306,000 g/mol.

4. The composition of matter of claim 1, wherein the non-crosslinked polymer fluid comprises at least one polymer compound, and wherein the polymer compound has an average molecular weight in the range of from about 63,000 g/mol to about 432,000 g/mol.

5. The composition of matter of claim 1, wherein the non-crosslinked polymer fluid is selected from the group consisting of polybutadiene, polyisoprene, poly(ethylene-co-butadiene), poly(ethylene-co-propylene), and polyisobutylene.

6. The composition of matter of claim 1, wherein the particulate material is selected from the group consisting of fumed silica, monodisperse silica spheres, fumed alumina, and mixtures thereof.

7. The composition of matter of claim 1, wherein the particulate material comprises particles of a size in the range of from about 10 nm to about 1 μm.

8. The composition of matter of claim 1, wherein the particulate material comprises particles having a surface chemistry such that the particles form non-covalent bonds with adjacent particles or with the non-crosslinked polymer fluid or with both the adjacent particles and the non-crosslinked polymer fluid.

9. The composition of matter of claim 1, wherein the composition of matter comprises from about 2 to about 55 percent by volume of the particulate material.

10. The composition of matter of claim 1, wherein the composition of matter comprises from about 28 to about 98 percent by volume of the non-crosslinked polymer fluid.

11. The composition of matter of claim 1, wherein the composition of matter comprises from about 45 to about 98 percent by volume of the non-crosslinked polymer fluid.

12. The composition of matter of claim 1, wherein the composition of matter comprises from about 51 to about 96 percent by volume of the non-crosslinked polymer fluid.

13. The composition of matter of claim 1, wherein the component for reducing adhesion of the composition comprises a particulate detackifying agent.

14. The composition of matter of claim 13, wherein the particulate detackifying agent comprises an average particle size of about 10 μm.

15. The composition of matter of claim 13, wherein the particulate detackifying agent comprises corn starch.

16. The composition of matter of claim 13, wherein the composition of matter comprises about 36.2 percent by volume of the particulate detackifying agent.

17. The composition of matter of claim 13, wherein the composition of matter comprises from about 10 to about 70 percent by volume of the particulate detackifying agent.

18. The composition of matter of claim 13, wherein the composition of matter comprises from about 30 to about 60 percent by volume of the particulate detackifying agent.

19. The composition of matter of claim 1, wherein the particulate material comprises particles of a size of about 100 nm.

20. The composition of matter of claim 1, further comprising a colorant.

21. A method of forming a composition of matter, the method comprising:
providing a non-crosslinked polymer fluid comprising at least one polymer compound having a molecular weight of entanglement ($MW_{ENT}$), and wherein the polymer compound has an average molecular weight in the range of from about two to about five times the $MW_{ENT}$;
dispersing a particulate material comprising cornstarch and no more than 10 volume percent fumed silica relative to the composition of matter within the non-crosslinked polymer, wherein the fumed silica forms reversible bonds through hydrogen bonding with the non-crosslinked polymer;
forming the composition of matter containing the non-crosslinked polymer and the particulate material, wherein the composition of matter comprises a viscoplastic property and has a minimal elastic response over the desired usable temperature of 50 F to 100 F; and
introducing a component for reducing adhesion of the composition therein.

22. A composition of matter comprising:
a polydimethylsiloxane fluid having a molecular weight in the range of from about 63,000 g/mol to about 306,000 g/mol; and
a particulate material that forms a reversible hydrogen bond with the polydimethylsiloxane dispersed within the polydimethylsiloxane, wherein the particulate material includes particles of a size in the range of from about 10 nm to about 1 μm that have a surface chemistry such that the particles exhibit non-covalent inter-particle interactions that can be broken during deformation when a force is applied to the composition of matter allowing the composition of matter to flow and that reform when the force is no longer applied to the composition of matter and deformation of the composition of matter has ceased;
a particulate detackifying agent introduced into the composition which reduces adhesion of the composition; and
wherein the composition of matter comprises a viscoplastic property and has a minimal elastic response over the desired usable temperature of 50 F to 100 F, where the material flows like a fluid under an applied force producing a deformed state in the composition of matter but then is dimensionally stable when the applied force is removed thus preserving the deformed state of the composition of matter after the applied force has been removed.

23. A composition of matter comprising:
a polysiloxane fluid; and
a particulate material dispersed within the polysiloxane, wherein the particulate material includes particles of a size in the range of from about 10 nm to about 1 μm that have a surface chemistry such that the particles form non-covalent bonds with the silicone-based, non-crosslinked polymer,
wherein the particulate material comprises fumed silica and cornstarch, wherein the fumed silica comprises no more than 18.8 volume percent of the composition of matter and the cornstarch comprises about 30 to about 60 volume percent of the composition of matter; and
wherein the composition of matter comprises a viscoplastic property and has a minimal elastic response over the desired usable temperature of 50 F to 100 F, where the material flows like a fluid under an applied force producing a deformed state in the composition of matter but then is dimensionally stable when the applied force is removed thus preserving the deformed state of the composition of matter after the applied force has been removed.

24. The composition of matter of claim 23 wherein the composition of matter comprises no more than 10 volume percent of fumed silica.

25. The composition of matter of claim 23 wherein the composition of matter comprises no more than 9 volume percent of fumed silica.

26. A composition of matter comprising:
a non-crosslinked polydimethylsiloxane fluid; and
a particulate material comprising not more than 10 volume percent of the composition of matter, wherein the particulate material is fumed silica and forms reversible hydrogen bonds with the non-crosslinked polydimethylsiloxane fluid, and
a component for reducing adhesion of the composition,
wherein the composition of matter comprises a viscoplastic property and minimal elastic response over the desired usable temperature of 50 F to 100 F,
and further wherein the composition of matter has an indentation response curve with an average plateau force that remains within plus or minus 1.0 N of a target force.

27. A composition of matter consisting essentially of:
a non-crosslinked polydimethylsiloxane fluid; and
fumed silica particulate material dispersed within the non-crosslinked polydimethylsiloxane fluid comprising not more than 10 volume percent of the composition of matter that forms reversible hydrogen bonds with the non-crosslinked polydimethylsiloxane fluid, cornstarch, and wherein the composition of matter comprises a viscoplastic property and minimal elastic response over the desired usable temperature of 50 F to 100 F, and further wherein the composition of matter has an indentation response curve with an average plateau force that remains within plus or minus 1.0 N of a target force.

28. A composition of matter comprising:

a non-crosslinked polydimethylsiloxane fluid having an average molecular weight in the range of from about two to about five times the molecular weight of entanglement ($MW_{ENT}$) of polydimethylsiloxane;

a particulate material comprising particles of a size of about 100 nm which forms reversible hydrogen bonds with the non-crosslinked polydimethylsiloxane fluid; and a particulate detackifying agent.

* * * * *